United States Patent [19]

Kobayashi et al.

[11] Patent Number: 5,401,793
[45] Date of Patent: Mar. 28, 1995

[54] INTUMESCENT FIRE-RESISTANT COATING, FIRE-RESISTANT MATERIAL, AND PROCESS FOR PRODUCING THE FIRE-RESISTANT MATERIAL

[75] Inventors: Nobuo Kobayashi, Tokyo; Hikaru Yoshioki, Saitama; Kenji Yoshida, Chiba; Katsunobu Sagawa, Tokyo; Shigehisa Ishihara, Kyoto, all of Japan

[73] Assignee: Dainippon Ink and Chemicals, Inc., Tokyo, Japan

[21] Appl. No.: 854,105

[22] Filed: Mar. 18, 1992

[30] Foreign Application Priority Data

Mar. 20, 1991 [JP] Japan ................................. 3-056760
Sep. 13, 1991 [JP] Japan ................................. 3-234736

[51] Int. Cl.$^6$ .......................... C08K 3/38; C08K 3/34; C08K 3/32; C08K 5/5333
[52] U.S. Cl. ........................... 524/401; 428/290; 428/416; 428/529; 428/531; 428/537.7; 523/179; 524/404; 524/406; 524/407; 524/408; 524/413; 524/415; 524/416; 524/428; 524/158; 524/422; 524/131
[58] Field of Search ............... 524/415, 416, 401, 404, 524/428, 406, 408, 413, 407, 100; 428/537.7, 416, 921, 920, 290, 529; 523/179; 525/540, 535, 538; 252/606, 607, 609

[56] References Cited

U.S. PATENT DOCUMENTS

| | | | |
|---|---|---|---|
| 3,395,035 | 7/1968 | Strauss | 523/179 |
| 3,562,197 | 2/1971 | Sears et al. | 524/415 |
| 3,714,111 | 1/1973 | Economy et al. | 524/404 |
| 3,883,482 | 5/1975 | Kroenke | 524/404 |
| 3,915,777 | 10/1975 | Kaplan . | |
| 4,002,597 | 1/1977 | Dickens | 524/404 |
| 4,074,015 | 2/1978 | Franz et al. | 252/609 |
| 4,115,351 | 9/1978 | Joh | 428/921 |
| 4,247,332 | 1/1981 | Kinoshita et al. | 524/428 |
| 4,247,435 | 1/1981 | Kasten . | |
| 4,460,730 | 7/1984 | Koyama et al. | 524/428 |
| 4,585,703 | 4/1986 | Taguchi et al. | 428/446 |
| 4,839,099 | 6/1989 | Umehara et al. | 252/607 |
| 4,879,320 | 11/1989 | Hastings | 523/179 |
| 4,985,307 | 1/1991 | Kobayashi et al. | 428/413 |

OTHER PUBLICATIONS

Database WPIL, accession No. 84-296626 [48], Derwent Publications Ltd, London, GB; & JP-A-59 182 264 (Dainippon Ink and Chemical).

*Primary Examiner*—Veronica P. Hoke
*Attorney, Agent, or Firm*—Armstrong, Westerman, Hattori, McLeland & Naughton

[57] ABSTRACT

An intumescent fire-resistant coating and a fire-resistant material using the same are disclosed, the coating essentially including (A) at least one inorganic compound selected from the group consisting of a carbide, boride, nitride, carbonitride, or carboboride of titanium, zirconium, vanadium, niobium, tantalum, molybdenum, tungsten, silicon or chromium and a carbide, nitride or carbonitride of boron, (B) a synthetic resin, and (C) at least one phosphorus and/or sulfur compound capable of forming a Lewis acid on heating.

53 Claims, No Drawings

INTUMESCENT FIRE-RESISTANT COATING, FIRE-RESISTANT MATERIAL, AND PROCESS FOR PRODUCING THE FIRE-RESISTANT MATERIAL

FIELD OF THE INVENTION

This invention relates to an intumescent fire-resistant coating to be coated on metallic materials, wood-based materials, and inorganic salt molded articles, e.g., plasterboards and calciumsilicate boards and to fire-resistant materials using the same. More particularly, it relates to an intumescent fire-resistant coating exhibiting high weight retention, improved compressive resistance and improved peel resistance even when continuously exposed to high temperatures on fire; a fire-resistant material comprising a base having laminated thereon a combination of the intumescent fire-resistant coating and inorganic fiber chopped stands; fire-resistant cement to be filled into spaces among constructional materials; and a fire-resistant mat to be used in void spaces among constructional materials. When the fire-resistant materials of this invention are used in building as constructional materials, such as structural frames, partition walls, and fire-resistant doors, and in vehicles, ships, and other constructions, they exhibit prevention or retardation of heat conduction to a greater degree than obtained by any conventional fire-resisting materials even when continuously exposed to high temperatures around 1000° C. after flashover on fire.

BACKGROUND OF THE INVENTION

Conventional flame-retarding techniques for endowing combustible materials, such as wood-based materials, synthetic resins, inorganic salt molded articles (e.g., plasterboard and calcium silicate board), and paper with resistance against ignition at a relatively low temperature in the initial stage of fire, e.g., 600° C. or lower, include (a) pressure-vacuum impregnation of fire-retarding chemicals into wood-based materials, (b) coating of a combustible material with a fire-retardant coating which foams on heating to form a heat insulating layer, and (c) laminating or lining of an incombustible inorganic layer on a combustible material.

The impregnation technique (a) is effective to prevent evolution of combustible gases from combustible materials on heating or selectively accelerate dehydration and carbonization but is, in turn, accompanied by considerable reductions in weight and volume. When continuously heated at, for example, about 1000° C., burn-through is rather accelerated under some conditions.

According to technique (b), the foamed heat-insulating layer exhibits excellent fire retardance in the initial stage of fire, i.e., at relatively low temperatures. However, since the fire-retardant coating must generally be expanded to 100 fold or more so as to produce sufficient heat insulation effects, the foamed layer is liable to remove partially or over the entire surface when continuously heated at around 1000° C. due to insufficient oxidation resistance and insufficient heat stream resistance.

Technique (c) is also very effective in the initial stage of fire at relatively low temperatures. When continuously heated at around 1000° C., however, the incombustible layer unavoidably undergoes cracking or bursting due to a difference in thermal expansion coefficient between the inorganic layer and the combustible material or due to a pressure increase resulting from vaporization of a water content. Therefore, satisfactory fire-resistance cannot be obtained without increasing the thickness and weight of the incombustible layer or increasing the number of layers to be laminated.

Thus, there has not yet been established a technique which makes a thin material (e.g., 15 mm thick plywood) fire-resistant to such a degree as having a burn-through time of at least 30 minutes in a fire test at a simulated temperature after flashover (JIS A-1304, ASTM E-119, DIN-4102, etc.) or which makes a thick material (e.g., a 30 to 40 mm thick wood-based material) fire-resistant to such a degree as having a burn-through time of at least 1 hour or thermal deformation resistance while retaining characteristics of wood-based materials, such as heat retaining properties, lightweight, high specific strength, aesthetic appeal, moisture absorption and desorption, workability, and the like.

Being incombustible of themselves, inorganic materials such as plasterboards, calcium silicate boards and concrete show incombustibility in the above-described initial stage of fire. However, they essentially suffer from bursting or cracking when continuously heated at around 1000° C. due to an increased vapor pressure of decomposed crystal water. A countermeasure which has generally been taken to avoid this is to thicken the material or to laminate a number of layers to thereby impart fire-resistance as desired. An attempt to make the material thinner by applying an intumescent fire-resistant coating or by laminating an intumescent fire-resistant mat has never been put to practical use.

Further, steel frames used as a structure of high buildings are essentially incombustible having a melting point exceeding 1500° C. However, when continuously heated at about 660° C. or higher under gravity or load, they suffers from an abrupt fall of strength, causing deformation or buckling. Fire-resisting of steel frames has generally been conducted through a hand method at the job site comprising winding a reinforcing net around the frames and spray coating thick with mortar containing incombustible fiber. In this field, too, application of an intumescent fire-resistant coating or laminating of an intumescent fire-resistant mat has not been established.

SUMMARY OF THE INVENTION

An object of the present invention is to provide a novel intumescent fire-resistant coating having excellent performance properties that have never been attained by the conventional intumescent fire-retardant coatings, that is:

1) capable of forming a uniform and hard foamed layer (intumescence) on heating,
2) prevented from excessive expansion on heating, i.e., reduction in density, which readily leads to peeling or fall-off of the foamed layer (intumescence) or cracking or deformation of the coated material with a hot blast,
3) capable of retarding an oxidative weight loss of the foamed layer (intumescence) while being heated at 400° to 1000° C. or even higher,
4) capable of sufficient expansion on heating to provide a foamed layer (intumescence) even when sandwiched between an organic or inorganic substrate or an organic/inorganic composite substrate and a decorative layer, e.g., sliced veneer or wall paper, 5) having satisfactory film properties, such as water resistance, strength, and adhesiveness, and manifesting its fire-resistant performance and physical and chemical durability upon foaming on fire.

Another object of the present invention is to provide a fire-resistant material having improved fire-resistant properties which is obtained by treating a substrate having a planar or non-planar surface or having pores with the above-described fire-resistant coating in combination with chopped strands by laminating, coating, filling, or the like technique.

The present invention relates to an intumescent fire-resistant coating essentially comprising (A) at least one inorganic compound selected from the group consisting of a carbide, boride, nitride, carbonitride or carboboride of titanium, zirconium, vanadium, niobium, tantalum, molybdenum, tungsten, or chromium and a carbide, nitride or carbonitride of boron, (B) a synthetic resin, and (C) at least one phosphorus and/or sulfur compound capable of forming a Lewis acid on heating; and to a fire-resistant material using the same.

DETAILED DESCRIPTION OF THE INVENTION

Any of the inorganic compounds which can be used in the intumescent coating of the present invention, e.g., titanium carbonitride, tungsten-titanium-tantalum carbide, boron carbide, titanium carbide, tungsten carbide, and boron nitride, is known useful as a raw material for highly fire-resistant properties or high strength sintered bodies, such as refractory bricks and abrasive materials, but has never been exploited as a component of intumescent or non-intumescent fire-resistant coatings. These inorganic compounds are chemically inert and have a much higher thermal decomposition temperature than the temperature of fire. This appears to be the reason why they are not expected to make any contribution to improvement of fire-resistant properties but to serve as a filler.

Hence, currently widespread intumescent or non-intumescent fire-retardant coatings comprise a synthetic resin, a phosphorus compound, a foaming agent, etc. without containing these inorganic compounds. With conditions being proper, such conventional coatings manifest a foaming and heat-insulating mechanism or, when applied to, for example, wood-based materials, form a carbide layer which effectively functions as a fire-resistive layer in a typical initial stage of fire, i.e., at a temperature of about 600° C. at the highest for a heating period of about 10 minutes at the longest. Nevertheless, in cases when the coating is exposed to a temperature as high as about 1000° C. reached after flashover for one consecutive hour, the coating layer or the foamed layer readily falls off to lose its fire-resistant function because the coating layer is rapidly oxidized or the foamed layer is brittle.

The inventors have made a selection of chemically inert and high-melting inorganic compounds through experimentation and developed an intumescent fire-resistant coating containing fine particles of such inorganic compounds as well as conventionally employed other components, e.g., synthetic resins, phosphorus compounds, and foaming agents, and which thereby exhibit markedly improved fire-resistant properties.

In the present invention, the inorganic compound should be used in the form of fine particles preferably having a particle size of not greater than 50 $\mu$m. Where an aesthetic appeal of the coating film is demanded, a particle size of not greater than 5 $\mu$m is particularly preferred. The particle size limitation is for prevention of phase separation in a coating composition, for prevention of reduction in coating film strength, and for improvement in rate of reaction between a Lewis acid produced at 600° C. or higher and the inorganic compound. These inorganic compounds have not been studied for use as a main component taking an important role in fire-resistant coatings probably because they have an extremely high melting point as shown below and are considered chemically stable. Heat-resistant characteristics of these compounds are shown in Table 1 below.

TABLE 1

| Inorganic Compound | Chemical Formula | Molecular Weight | Melting or Decomposition Point (in air) (°C.) |
|---|---|---|---|
| Boron carbide | $B_4C$ | 55.24 | 2450 |
| Tungsten carbide | WC | 195.90 | 2860 |
| Titanium carbide | TiC | 59.91 | 3200 |
| Molybdenum carbide | $Mo_2C$ | 203.81 | 2522 |
| Zirconium carbide | ZrC | 103.23 | 3580 |
| Vanadium carbide | VC | 62.95 | 2648 |
| Niobium carbide | NbC | 92.92 | 3613 |
| Tantalum carbide | TaC | 192.96 | 3985 |
| Titanium boride | $TiB_2$ | 69.52 | 2790 |
| Zirconium boride | $ZrB_2$ | 112.84 | 3200 |
| Tantalum boride | $TaB_2$ | 202.62 | 3037 |
| Chromium boride | CrB | 62.81 | 2100 |
| Molybdenum boride | MoB | 106.75 | 2550 |
| Tungsten boride | WB | 194.66 | 2800 |
| Boron nitride | BN | 24.83 | 1000 |
| Titanium nitride | TiN | 61.9 | 2950 |
| Zirconium nitride | ZrN | 105.22 | 2980 |
| Vanadium nitride | VN | 64.94 | 2050 |
| Niobium nitride | NbN | 106.91 | 2300 |
| Tantalum nitride | TaN | 194.95 | 3087 |
| Tungsten carbide/ titanium carbide | WC/TIC (50/50) | 127.91 | 3000 |
| Tungsten carbide/ titanium carbide/ tantalum carbide | WC/TiC/TaC (50/30/20) | 154.51 | 3000 |

In general, the ignition temperature of wood is about 260° C., the melting point of aluminum is 660° C., and the temperature at which a plasterboard releases its crystal water is between 100° and 150° C. Although steel frames for buildings have a melting point exceeding 1500° C., it is believed that their strength is suddenly reduced at around 600° C. to cause buckling. From these situations, it is generally accepted that these high-melting inorganic compounds, when added to a fire-resistant coating, can be expected to exert no function but as a mere aggregate.

General fire-retardant coatings are completely decomposed in temperatures of from 550° to 700° C., leaving only inorganic matters. However, when these inorganic compounds are added to general fire-resistant formulations having a phosphorus content or a nitrogen content, it was confirmed in any case that the resulting coating film has a reduced weight loss when continuously heated up to about 1000° C. as determined with a thermobalance. Under some conditions, surprising cases were met in which the weight rather increased with a temperature rise over 600° C., which phenomenon implies occurrence of a kind of chemical reactions. In fact, the results of differential thermal analysis revealed 1 to 3 significant exothermic peaks in the temperature range of from 450° to 900° C., suggesting unknown reactions between the inorganic compound added and carbon, nitrogen or phosphorus constituting the coating formulation. Accordingly, it is assumed that the inorganic compound forms a firm chemical bond with a Lewis acid produced on heating from the phosphorus compound and/or the sulfur compound and carbon, nitrogen or oxygen constituting the synthetic resin to thereby forman extremely dense foamed layer having fire-resistance and heat stream resistance.

What is noteworthy is that addition of only 1% by weight or less of such an inorganic compound in the form of fine particles of about 1 μm brings about marked improvements in height (degree of expansion), hardness, and density of the foamed layer.

The above-enumerated inorganic compounds may be used either individually or in combinations of two or more thereof.

The inventors conducted the same experiments except for using graphite power, colloidal silica, etc. in place of the inorganic compounds for the sake of comparison but failed to observe the above-described behaviors. The present invention has been completed based on this finding.

Typical examples of the inorganic compounds to be used in the present invention are described below in detail.

Inorganic Compound-1

Boron carbide, a black crystalline powder of rhombic shape having an average particle size of not more than 50 μm, and preferably not more than 5 μm. Commercially available from Electro Chemical Industry Co., Ltd., Ibiden K.K., and Mitsubishi Metal Mining Co., Ltd.

Inorganic Compound-2

Tungsten carbide, a black hexagonal powder having an average particle size of not more than 50 μm, and preferably not more than 5 μm. Commercially available from Tokyo Tungsten K.K. and Nippon Shinkinzoku K.K.

Inorganic Compound-3

Titanium carbide, a bronzy cubic powder having an average particle size of not more than 50 μm, and preferably not more than 5 μm. Commercially available from Kyoritsu Yogyo Genryo Kaisha, Ltd., Electro Chemical Industry Co., Ltd., Nippon Shinkinzoku K.K., and Mitsubishi Metal Mining Co., Ltd.

Inorganic Compound-4

Silicon nitride inclusive of disilicon trinitride ($Si_2N_3$), monosilicon mononitride (SIN), silicon tetranitride ($Si_3N_4$), and mixtures thereof. Gray powders having an average particle size of not more than 50 μm, and preferably not more than 5 μm. Commercially available from Electro Chemical Industry Co., Ltd., Nippon Denko Co., Ltd.; Kyocera K.K., Asahi Glass Co., Ltd., Ube Industries, Ltd., Toso K.K., Shin-Etsu Chemical Industry Co., Ltd., and Showa Denko K.K.

Inorganic Compound-5

Boron nitride, a white powder. It is of wide use in external fire-resistant coatings. Commercially available from Electro Chemical Industry Co., Ltd., Showa Denko K.K., Shin-Etsu Chemical Industry Co., Ltd., Ube Chemical Industries Co., Ltd., and Mitsui Toatsu Chemicals Inc.

Of the inorganic compounds useful in the present invention, carbides, carbonitrides, and solid solutions of carbides of two or more elements produce particularly excellent effects, and nitrides come next. All these inorganic compounds are raw materials to be molded and sintered to provide fine ceramics having higher hardness than metals, such as cutting tools and abrasives. Any of them can be purchased of the above-described companies.

The phosphorus compound which can be used in the present invention is a compound which decomposes on heating in air, preferably to a temperature of 200° C. or more, to form a phosphorus oxide functioning as a Lewis acid. Included in such phosphorus compounds are phosphoric acid and polyphosphoric acid and ammonium or organic amine salts thereof. Alkali metal salts or other metallic salts of these acids are excluded. The following compounds are specific examples of suitable phosphorus compounds, which are excellent in water resistance as well.

Phosphorus Compound-1

High molecular weight ammonium polyphosphate (having a weight average molecular weight of several tens of thousands) encapsulated with a melamine resin. The capsules exhibit high resistance against water when mixed with an aqueous synthetic resin vehicle. A commercially available product, "EXOLIT 462" (a trade name of Hoechst Japan Co., Ltd.), is very suited to the purpose.

Phosphorus Compound-2

A group of acid amide compounds and condensates or derivatives thereof. These compounds are suitable as an additive of fire-resistant coatings for wood-based materials comprising a water-soluble or alcohol-soluble melamine-based condensate. In particular, a 3-(dialkylphosphono)propionamide having not more than 3 carbon atoms in the alkyl group thereof, and particularly 3-(dimethylphosphono)propionamide, which easily undergoes methylene condensation at a pH of 3 or less is the most suitable for effective cold setting of the coating film at 100° C. or lower. Coating formulations giving a coating film with the highest water resistance as ever attained are described in detail in U.S. Pat. No. 4,839,099. Specific examples of commercially available phosphorus compounds of this group are a 70% aqueous solution "ROOF-PROOF P" and a 40% methanol solution "FRAME GUARD 5527" (both produced by Dainippon Ink & Chemicals, Inc.). In particular, where phenolic resins are used in combination, a methylol compound thereof, "PYROBATEX CP" (produced by Chiba Geigy) is useful.

Phosphorus Compound-3

Also included in phosphorus compounds to be added to phenolic resins to impart high fire-resistant properties is 3(di-$C_{1-3}$alkylphosphono)-dimethylsuccinate as disclosed in JP-A-3-1342 (the term "JP-A" as used herein means an "unexamined published Japanese patent application").

In addition, various organic or inorganic phosphorus compounds capable of forming a Lewis acid on decomposition under high temperature heating, such as phosphoric acid, phosphoric acid salts, phosphoric esters, and phosphazen derivatives, are also useful.

Sulfur Compound

The sulfur compounds capable of forming a Lewis acid on heating which can be used in the present invention include sulfuric acid, sulfamic acid, and p-toluenesulfonic acid, and ammonium or amine salts thereof.

The synthetic resins which can be used in the present invention are not particularly limited, but nitrogen-containing synthetic resins are recommended for obtaining high foaming properties. Examples of condensation resins are melamine resins, urea resins, and phenolic resins, which can be used either individually or in combination. Unsaturated polyester resins are also employable. Of these synthetic resins, melamine resins include methylol melamine compounds and alkoxymethylated melamine compounds obtained by reaction with an alcohol having not more than 3 carbon atoms. To meet the purpose, water-soluble, water-dispersible, or alcohol-soluble synthetic resins are preferably used either individually or in combinations thereof. Typical examples of useful synthetic resins are described below.

Resin-1

Water-dispersible urea resins exhibiting excellent intumescent properties in the presence of a Lewis acid-forming substance. "Beckamine P-364BL" (produced by Dainippon Ink & Chemicals, Inc.) is included in this group. In order to prevent hydrolysis by aging and to improve crack resistance, they are preferably used in combination with melamine resins. Further included is a dispersion of a urea resin fine powder "U-pal" (produced by Mitsui Toatsu Chemicals In.d).

Resin-2

Water-soluble or water-dispersible melamine resins exhibiting excellent intumescent properties on heating in the presence of a Lewis acid-forming substance, and melamine resins miscible therewith. Examples of such resins are "ROOF-PROOF FIX", "WATERSOL S-695", "WATERSOL S-683-IM", and "BECKAMINE J-101" (all produced by Dainippon Ink & Chemicals, Inc.); "CYMEL 300", "CYMEL 738", "CYMEL 370", and "CYMEL 238" (all produced by Mitsui Cyanamid Kagaku Kogyo K.K.). A mixed use of these resins provides formulations with which plasticization of the coating film or prevention of cracking can be achieved.

Resin-3

Alcohol-soluble and cold-setting phenolic resins having a high degree of condensation. These phenolic resins exhibit excellent fire-resistant properties in the presence of a Lewis acid-forming substance and prevent thermal deterioration of the coated material and can be used either individually or in combination with the above-described melamine resins (Resin-2). Examples of these resins include those comprising about 5 phenol nuclei linked through a methylene bond and acid-curable at room temperature, e.g., "PLYOPHEN TD-2443LV" and "PLYOPHEN TD-5010" (both produced by Dainippon Ink & Chemicals, Inc.). They are suitable for fire-resistant coatings requiring adhesiveness.

Synthetic polymerization resins capable of forming a film on drying, such as solution or emulsion copolymers of vinyl acetate, acrylic acid, acrylic esters, etc., are also useful as a resin component. Examples of such polymerization resins are described below.

Resin-4

Acrylic ester emulsion polymers, such as "VONCOAT 4001" and "VONCOAT SFC-55" (both produced by Dainippon Ink & Chemicals, Inc.). In particular, those which are prepared by using a nonionic and/or cationic emulsifying agent and which have a minimum film-forming temperature of 10° C. or lower are preferred.

Resin-5

Emulsion copolymers of vinyl acetate and a higher fatty acid vinyl ester or acrylic ester monomer serving as an internal plasticizer, such as "BONCOAT 6290" and "VONCOAT 6620" (both produced by Dainippon Ink & Chemicals, Inc.).

Resin-6

For use in applications attaching no weight to light resistance, emulsion copolymers of butadiene and styrene and/or acrylonitrile which may further contain acrylic acid or methacrylic acid as a copolymerization component are also useful. Examples of such emulsion copolymers are "LACSTAR DS-613" (butadiene-styrene copolymer) and "LACSTAR DS-704" (butadiene-acrylonitrile copolymer) (both produced by Dainippon Ink & Chemicals, Inc.).

In order to improve water-resistance of these polymerization resins, it is effective to use crosslinking agents, such as melamine resins and epoxy resins, in combination.

Polyaddition synthetic resins capable of forming a film on drying or capable of crosslinking curing when mixed are also useful. Included therein are various modified polyurethane resin elastomers and two-pack type organic solvents. Examples of commercially available products of such resins are as follows.

Resin-7

Saturated polyester components of two-pack type polyurethane resins, such as "BURNOCK D-220" and "BURNOCK D-161" (both produced by Dainippon Ink & Chemicals, Inc.).

Resin-8

Alkyl resin components of two-pack type polyurethane resins, such as "BURNOCK DE-140-70" (produced by Dainippon Ink & Chemicals, Inc.).

Resin-9

Triazine resin components of two-pack type polyurethane resins, such as "BURNOCK 140-70" (produced by Dainippon Ink & Chemicals, Inc.).

Resin-10

Polyisocyanate components of two-pack polyurethane resins, which are used in combination with the above-described urethane polymers for crosslinking curing and have excellent discoloration resistance, such as "BURNOCK DN-950", "BURNOCK DN-990", and "BURNOCK DN-992" (all produced by Dainippon Ink & Chemicals, Inc.).

Resin-11

One-pack type polyurethane resins curable by the action of moisture in air, such as "BURNOCK DM-652" and "BURNOCK DM-678" (both produced by Dainippon Ink & Chemicals, Inc.).

Resin-12

One-pack type organic solvent solutions of polyurethane elastomers which cure simply by drying to form a film excellent in stretchability and adhesion to metals or wood-based materials, such as "CRISVON 7367EL", "CRISVON NB-130", "TYFORCE AD-865", and "TYFORCE AG-946" (all produced by Dainippon Ink & Chemicals, Inc.).

Various modified epoxy formulations are also effective as a vehicle component of fire-resistant coatings to be coated and baked on a metallic surface. Examples of such epoxy resins and curing agents therefor which endow a foamed layer with particularly excellent resistance to fall-off caused by heat stream are shown below.

Resin-13

Bisphenol A type epoxy resins, such as "EPICLON 1050", "EPICLON 900-IM", and "EPICLON 1600-75X" (all produced by Dainippon Ink & Chemicals, Inc.).

Resin-14

Polyamide resin type curing agents for Resin-13, such as "LUCKAMIDE TD-982" and "LUCKAMIDE TD-984" (both produced by Dainippon Ink & Chemicals, Inc.).

Resin-15

Phenolic resin type curing agents for Resin-13, such as "BURCUM TD-2131" and "BURCUM TD-2090" (both produced by Dainippon Ink & Chemicals, Inc.).

Resin-16

Amine compound-added epoxy resin type curing agents for Resin-13, such as "EPICLON B-3150" and "EPICLON B065" (both produced by Dainippon Ink & Chemicals, Inc.).

In addition, solid polymer resins or plastisol, such as chlorinated paraffin, polyvinyl chloride, polyolefins, chlorinated rubbers, rubbers, and polyurethane elastomers, kneaded with other components of the present invention in a heating calender, can also be used either as obtained in the form of a paste or in the form of a flexible sheet.

In cases where an intumescent fire-resistant coating contains, as a single foaming agent, a compound having a relatively high decomposition temperature within a narrow range (e.g., between 320° and 350° C.), such as melamine powder, melamine resins, and isocyanuric acid, which does not remarkably reduce water-resistance of a fire-resistant coating as observed with dicyandiamide condensates but is inferior to dicyandiamide condensates in foaming performance at low temperatures, there were observed the following disadvantages. When the intumescent fire-resistant coating containing such a foaming agent alone is suddenly heated on fire or in a fire test, the foaming agent generates decomposition gas too abruptly and, also, the binder component of the fire-resistant coating would have been heat-decomposed to a considerable degree by the time the heating temperature reaches such a high temperature so that the carbon content and nitrogen content required for formation of an intumescence are consumed without avail. Accordingly, the fire-resistant coating must be coated to a greater spread than necessary. Besides, such abrupt evolution of decomposition gas causes giant voids in the inside of the intumescence. Such giant voids accelerate fall-off of the intumescence by a heat stream, or heat is conducted to the coated substrate through the parts having a reduced density due to the void formation, or ignition or burn-through takes place on the low density parts.

The inventors found that the above disadvantages can be eliminated by using at least one organic foaming agent having a relatively low decomposition temperature between 100° and 400° C., and preferably between 100° and 220° C. (hereinafter referred to as low-decomposing foaming agent), such as azo type foaming agents, sulfonylhydrazide type foaming agents, nitroso type foaming agents, and mixtures thereof, in combination with the above-described foaming agent having a high decomposition temperature. In this case, an intumescence is formed through two or more steps so that formation of giant voids in the inside of the intumescence can be effectively prevented. The organic low-decomposing foaming agents to be used here are preferably non- or low aqueous-soluble. The low-decomposing foaming agent(s) are added in a total amount of not more than 10% by weight, and preferably from 1 to 5% by weight, based on the fire-resistant coating. Specific but non-limiting examples of finely-ground and lower aqueous-soluble organic low-decomposing foaming agents which can be used in the present invention are shown below.

| Compound No. | Compound Name | Appearance | Heat Decomposition Temp. (°C.) |
|---|---|---|---|
| 1 | Azodicarbonamide | pale yellow | 200–210 |
| 2 | Azoisobutyronitrile | white | 100–102 |
| 3 | N,N'-Dinitrosopentamethylenetetramine | pale yellow | 200–205 |
| 4 | 4,4'-Hydroxybisbenzenesulfonyl hydrazide | pale yellow | 150–159 |
| 5 | p-Toluenesulfonyl hydrazide | white | 103–111 |
| 6 | p,p'-Hydroxybis(benzenesulfonyl hydrazide) | white | 155–160 |
| 7 | Hydrazocarbonamide | white | 215–220 |

These foaming agents are produced and commercially sold by Eiwa Kasei Kogyo K.K. The compounds other than azoisobutyronitrile are also produced and sold by Sankyo Kasei Kogyo K.K.

By a combined use of these low-decomposing foaming agents (decomposition temperature: 100° to 220° C.) and high-decomposing foaming agents, foaming proceeds in at least two divided steps with a rise in temperature to obtain desired fire-resistant properties. Examples of the high-decomposing foaming agents to be used in combination are described below.

Foaming Agent-8

Melamine powder, a low aqueous-soluble white powder having a nitrogen content of 66.7%. Very useful as it abruptly evolves a large quantity of nitrogen gas when heated at temperatures above its kick-off temperature, 354° C. When used alone, it completes decomposition at about 450° C. Commercially available from Nissan Chemicals Industries, Ltd., Mitsubishi Petro-Chemicals Co., Ltd., and Mitsui Toatsu Chemicals Inc.

Foaming Agent-9

The urea resins described as Resin-1 and the melamine resins described as Resin-2 exhibit film forming properties combined with foaming properties. Urea-melamine condensation resin powders and mixtures of the above resins are similarly effective.

Foaming Agent-10

Isocyanuric acid, a low aqueous-soluble white powder having a decomposition temperature of about 330° C. Commercially available from Shikoku Kasei Co., Ltd.

Combinations of the above-described foaming agents, synthetic resins, and phosphorus compounds afford a great number of fire-resistant coating formulations. In particular, excellent formulations can be obtained from (1) Phosphorus Compounds-1 to 3 (or other phosphorus compounds of the same effect) in a total amount of from 15 to 40% by weight, (2) Resins-1 to 16 (or other synthetic resins of the same effect) in a total amount of from 20 to 40% by weight, (3) Inorganic Compounds-1 to 6 in a total amount of from 0.1 to 20% by weight, and (4) Foaming Agents-1 to 7 in a total amount of from 1 to 40% by weight, each on a solid basis.

The effects of the low-decomposing foaming agents such as Foaming Agents 1 to 7 are sufficiently manifested in a total amount of 10% by weight or less, and preferably between 1 to 5% by weight.

In the preparation of the intumescent fire-resistant coating of the present invention, the main raw materials other than high-molecular weight compounds are all used in the form of powder (or paste in some cases). In some cases, 80% or more of the raw materials are in the form of powder. The powderous raw materials are uniformly dispersed in a solution, emulsion or dispersion of a binder resin. From the standpoint of fire-resistance, coating properties, appearance of a coating film, pot-life of the coating, and working efficiency, it is important to adjust the dispersion to have an appropriate viscosity according to the method of application, a low Newtonian viscosity so as to maintain the dispersion in a state showing no dilatancy, and to have as a high concentration as possible.

In using a solution of non-aqueous high-molecular compound as a binder, the above-described adjustments can be achieved by proper selection of molecular weight or concentration of the high-molecular weight compound or addition of a thickener so as to maintain an appropriate viscosity, and the mixture is thoroughly kneaded in a mixer or a roll. Further, size reduction of the raw material powders makes it possible to prepare formulations free from settling for a long time. In using a water-soluble or water-dispersible high-molecular weight compound or an initial condensate as a binder, the above-described adjustments can be achieved by the same techniques as for the case of using a non-aqueous high-molecular weight compound solution. Additionally, a high-molecular weight dispersing agent (e.g., sodium polyacrylate), a surface active agent (e.g., sodium dodecylbenzenesulfonate) or any other known dispersing agent may previously be added to the dispersion in an amount of about 2% or less based on the total weight of the raw material powders so as to prevent sedimentation of solid contents or to improve fluidity. Some of these adjustment techniques are shown in Examples hereinafter described.

The intumescent fire-resistant coating according to the present invention, formulated according to the shape of the base to be coated or the coating method employed, can be applied by various known coating techniques, e.g., dip coating, brush coating, hand roll coating, spray coating, roll coating, flow coating, and the like.

If desired, the intumescent fire-resistant coating of the present invention and at least one layer of incombustible woven fabric made of glass fiber, carbon fiber, etc. may be laminated on a substrate to markedly improve heat stream resistance, compressive resistance, resistance to water for fire-fighting, etc. Such a laminating method is useful as a fire-resisting treatment of steel frames without using asbestos. Further, two or three layers of the intumescent coating of the present invention and woven glass fabric may be laminated on a wood-based substrate and, while the laminated layers being undried or uncured, a decorative layer having a thickness of about 2 to 5 mm, e.g., decorative plywood, sliced veneer, printed decorative paper, wall paper, and wall covering cloth, may further be adhered thereon with an adhesive (which may contain fire-resistant components). In this embodiment, with the formulation of the coating and the thickness and kind of the substrate being proper, the intumescent fire-resistant coating forms such a hard and tough carbonized layer that is not crushed by carbon residues of the surface organic decorative layer in, for example, a 1-hour fire test according to JIS A-1304 or ASTM E-119, revealing an obvious extension of burn-through time as demonstrated in the Examples. When the coated fire-resistant layer becomes dry or cure before adhesion of a decorative layer, the fire-resistant coating of the present invention can be used as the adhesive to further improve fire-resistant properties. Any other known synthetic resin adhesives may also be used.

Fire-resistant materials according to the present invention will now be described below in detail. The fire-resistant material of the present invention comprises a substrate with planar or non-planar surfaces having provided thereon a combination of an intumescent fire-resistant coating containing nitrogen and phosphorus and chopped strands of inorganic fiber. Such fire-resistant materials achieve great improvements on various unfavorable phenomena on continuous heating at around 1000° C., such as burn-through, reduction in strength, deformation, shrinkage, disintegration, melting, cracking, strike-through (leak to the back surface) of smoke and flames, and shortage of fire-resistance due to fall-off of an intumescence or reduction in density of an intumescence. That is, the fire-resistant materials according to the present invention possess performance properties and advantages that have never been attained by the conventional fire-resistant treatments. Such effects of the fire-resistant materials of the invention are summarized below:

1) When a substrate having laminated thereon a layer of chopped strands having a cut length of from 3 to 100 mm, preferably 50±10 mm, and more preferably a chopped strand mat made of alkali-free glass, and a layer of a selected intumescent fire-resistant coating is continuously heated to high temperatures, the former layer exhibits heat melting resistance while undergoing three-dimensional expansion to a surprising degree to thereby form a reinforcing structural layer having a low specific gravity, a high strength, and a complicated interlocking structure in one body with the intumescence.

There is thus obtained excellent resistant properties against fall-off of the intumescence by gravity, a heat stream under heating, or water for fire-fighting.

2) On heating, the coating film expands to form an intumescence without forming giant voids therein. That is, a uniform and dense intumescence can be formed.

3) On heating, the coating film is prevented from overall or partial excessive expansion which would lead to a reduction in density of the intumescence. In other words, the coating film expands to have an even thickness and is therefore free from problems arising from a reduced density of the intumescence, such as peel or fall-off of the intumescence, cracking or deformation of the substrate, and burn-through in the earlier stage of fire at the parts lacking in foaming.

4) On continuous heating, the rate of weight loss of the intumescence due to oxidation is greatly retarded.

5) In the case of boards having adhered thereon a decorative layer, such as decorative plywood, sliced veneer, and wall paper, with an adhesive, the carbonization residues or combustion residues of the decorative layer or adhesive are prevented from pressing the intumescence and causing reductions of fire-resistant properties of the intumescence.

6) Although a wood-based material having laminated thereon at least one layer of the fire-resistant coating and at least one layer of inorganic fiber woven fabric has improved strength as described above, the reinforcing effect is still insufficient because the inorganic woven fabric undergoes heat shrinkage and partial breaks, often resulting in partial fall-off of the intumescence at the extremities. Such a disadvantage can be eliminated.

7) The requisite thickness and weight of fire-resistant materials can be reduced as compared with those required in the conventional fire-resistant materials.

8) Covering of steel frames with inorganic fiber that has been carried out by a hand method at the job site can be done in a factory thereby increasing productivity.

9) Steps that have been performed at the job site, such as filling gaps, grooves, holes, etc. of a fire-resistant material with a fire-resistant coating to enhance the fire-resistant properties, can be carried out in a factory to considerable degrees. Reliability on performance properties and productivity can thus be improved.

The intumescent fire-resistant coating which can be used in the above-described fire-resistant materials according to the present invention includes not only the above-described formulations essentially containing an inorganic compound but also those containing no inorganic compound, with the former formulations being preferred. Further, fire-resistant formulations having an increased content of silicon carbide, silicon nitride, silicon boride, silicon carbonitride or silicon carboboride also produce excellent effects.

The chopped strands of inorganic fiber to be used in the present invention preferably include glass fiber chopped strands. The chopped strands have a length ranging from 3 to 100 mm. Where they are adhered on a metallic or wood-based material with an adhesive, a length of from 40 to 60 mm is particularly preferred.

Specific examples of suitable chopped strands to be used include a chopped strand mat "ECM 230-501" produced by Central Glass Co., Ltd. which is made of alkali-free glass (E type) chopped strands composed of about 400 monofilaments each having a diameter of from 9 to 10 μm, having been surface treated with a silicon coupling agent, and integrated with polyester as a sizing, and having a basis weight of 230 g/m$^2$ and a chopped strand mat "MC 300" produced by Nitto Boseki Co., Ltd. which is made of substantially the same materials as used in "ECM 230-501" but having a basis weight of about 300 g/m$^2$. The above-recited basis weight of the chopped strand mat is not limitative.

For direct incorporation into a fire-resistant coating, chopped strands of 3 to 12 mm in length are useful. Specific examples of such chopped strands are those having the same composition and structure as the above-enumerated ones, except for the length, e.g., "CS", "3E" and "227" produced by Nitto Boseki Co., Ltd. and "ECS 03-350" produced by Central Glass Co., Ltd.

Typical glass to be used is E type (alkali-free glass).

The intumescent fire-resistant coating and chopped strands of inorganic fiber are used in combination either separately or simultaneously according to the following five embodiments.

A first embodiment of combined use comprises coating a base with an intumescent fire-resistant coating having previously incorporated therein chopped strands. This embodiment can be carried out in various manners, such as a method of coating on a steel frame having been coated with an anticorrosive paint; a method comprising casting a fire-resistant coating containing 80% by weight or more of chopped strands in a groove of 15 to 25 mm wide and 3 to 10 mm deep provided on the periphery of a stile of a wood-based door panel (on the surfaces to be in contact with a door panel retainer frame), curing the coating, smoothening the coated surface, and laminating a thin decorative layer thereon to produce a wood-based fire-resistant door whose fire-resistant layer expands on fire to clog gaps between the door and the frame to shut out smoke or flame; a method comprising laminating or filling a chopped strand-containing fire-resistant coating into gaps between a plain material of buildings demanding fire-resistance (e.g., partition wall, floor, ceiling) and piping or wiring or laminating the same on the surface of piping; and a method of coating on parts of buildings out of sight (e.g., roofing boards or roof-sheathing) and, if desired, further laminating a decorative layer thereon or further giving any other fire-resistant water-resistant coat thereon.

A second embodiment of combined use comprises scattering chopped strands on the surface (preferably a plain surface of easy release) of a substrate, spraying thereon an adhesive (preferably a fire-resistant adhesive) followed by drying, coating thereon an intumescent phosphorus-containing organic fire-resistant coating by flow coating, hand lay-up, spray coating, curtain coating, etc., followed by drying to obtain an integrated sheet, and laminating the sheet on a substrate with a fire-resistant or non-resistant adhesive. If desired, woven glass fabric, etc. may be laminated on the intumescent fire-resistant coating layer while wet, followed by drying. Further, a decorative layer may be further laminated on the resulting fire-resistant material, or the surface of the resulting fire-resistant material may be finished with any other fire-resistant coating.

A third embodiment of combined use consists of laminating or finishing on a commercially available chopped strand mat in the same manner as in the second method.

A fourth embodiment of combined use comprises coating the surface of a substrate with a fire-resistant or non-resistant adhesive, laminating thereon chopped strands or chopped strand mat, and, either after drying or while wet depending on the kind of the fire-resistant coating used, and laminating a fire-resistant coating. Finishing may be carried out in the same manner as in the second method.

A fifth embodiment of combined use comprises kneading a solid polymer (e.g., polyurethane elastomers, chlorinated rubbers) or a plastisol (a mixture with a plasticizer), chopped strands, a phosphorus compound, a nitrogen-containing compound and preferably an inorganic compound in a heating calender to obtain a sheet, and laminating the sheet on a base by means of an adhesive and a press. The pasty compound as obtained by kneading may be coated as such on a substrate followed by heating for adhesion.

In any of these five embodiments of combined use, it is advantageous to additionally laminate inorganic fiber fabric, such as glass fiber fabric, on the laminate. The inorganic fiber fabric functions to press down projecting parts of the chopped strands to hold them in place, to make it easier to adhere a thin decorative layer, to make paint finishing easier, and to prevent delamination of a decorative layer from the fire-resistant layer or loss of surface smoothness due to weathering for a long time. In cases where a non-fire resistive adhesive is used, such an inorganic fiber fabric layer also serves to prevent the adhesive from diffusing into the fire-resistant layer thereby retaining fire-resistant performance.

Further, a method comprising previously uniting chopped strand mat and inorganic fabric (e.g., glass fiber fabric) by means of a needle punch using combustible yarn, immersing the needled mat in a fire-resistant coating, squeezing the impregnated mat with a squeegee roll, drying and/or curing the impregnated coating to obtain a sheet, and adhering the sheet on a substrate with a fire-resistant or non-resistant adhesive, or adhering the impregnated and squeezed mat while undried on a base is of high advantage from the standpoint of productivity.

The substrates which can be used in the fire-resistant materials of the present invention include metallic substrates, non-metallic inorganic molded articles, wood-based materials, and paper. These substrates may have a plain surface or a non-plain surface, such as an embossed surface, a curved surface, a wavy surface, and an L-shaped surface.

Where a fire-resistant coating containing a condensation resin, e.g., a melamine resin and a phenolic resin, is directly coated on a base surface made of or containing inorganic substances other than metals (e.g., plasterboard, concrete, calcium silicate board) or paper, cases are sometimes met in which the adhesive strength is reduced, paper is deteriorated, or a strongly alkaline component in cement consumes the fire-resistant phosphorus content, resulting in reduction of fire-resistant performance properties. This being the case, the coating of the fire-resistant coating should be preceded by coating of a 5 to 10% aqueous solution of hydroxyethyl cellulose or polyvinyl alcohol having a molecular weight of 500 to 2000 and a degree of saponification of 50% or higher to a spread of 50 to 100 $g/m^2$ and drying. The thus formed polyvinyl alcohol layer acts as a barrier layer and effectively prevents the above-described disadvantages.

In using a wood-based material as a substrate to be treated, it is very effective for prevention of crazing of the substrate on continuous heating in high temperatures that the wood-based material be previously coated with a primer essentially comprising the above-described phosphorus or sulfur compound capable of producing a Lewis acid on heating and a melamine resin, preferably a resol type phenolic resin containing about 5 phenol nuclei in average per molecule. Further, the primer is also effective as an adhesive for laminating chopped strands on a substrate to further improve fire-resistant performance. Specific examples of useful primer formulations are described in the Examples.

Through the experiments leading to the present invention, the inventors have confirmed improving effects of the combined use of chopped strands of inorganic fiber and an intumescent fire-resistant coating exerted upon fire-resistance performance properties as described below. The following assumption would be safe to account for the effects.

In general, glass fiber per se is incombustible irrespective of kind but is usually fused or disintegrated at temperatures above about 300° C. The fire-resistant coating of the present invention completes the thermal decomposition of its organic components at around 550° C. The inventors have tested combinations of the fire-resistant coating of the invention and various inorganic fibrous materials and confirmed that only a combination with chopped strands exerts specific effects of improving fire-resistant performance in shape and strength retention even when continuously exposed to high temperatures around 1000° C.

For example, when a substrate having laminated thereon a mixed layer comprising glass staple fiber and the fire-resistant coating of the invention was continuously heated at about 1000° C., it was proved that the glass staple fiber produces substantially no effect of reinforcing the intumescence or rather acts to reduce the fire-resistant performance. This seems to be because the individual filament having adhered thereon a surface treating agent rapidly reaches to its melting point on heating and immediately fused or disintegrated within the intumescence.

Also when nonwoven fabric or paper of glass monofilaments is laminated in combination with a fire-resistant coating, on close examination of the formed intumescence, there are found in places the remains of the laminate retaining its shape (most places are decomposed by heat) but completely lose the initial strength. No evidence proving that the glass fiber made any contribution to extension of the burn-through time of the coated material was observed.

However, where woven glass fabric or woven roving fabric is used, there is exerted an anchor effect on the intumescence to physically reinforce the intumescence. For example, when a small specimen like a 30-by-30 mm square was applied to a heating test, a significant improvement in fire-resistant properties was observed with extremely high reproducibility. The use of woven glass fabric is, in other words, a kind of a method of leveling the spread of a fire-resistant coating taking advantage of the surface tension assigned to the crossover structure of warp and weft. It appears therefore that the laminating of the intumescent fire-resistant coating and glass fiber makes an intumescence include a sufficient amount of the fire-resistant coating, contributing to an improvement in fire-resistant performance.

Further, all glass products contain oxides of aluminum, calcium, magnesium, etc. in common. These oxide components react with a Lewis acid, an oxide of phosphorus or sulfur produced on heating of the fire-resistant coating of the present invention, to form a firm three-dimensional crosslinked structure in high temperatures, and the contact area with air of the fire-resistant coating is increased by the presence of woven glass fabric to accelerate evaporation thereby to accelerate the curing reaction of the coating. These are assumed to be reasons for the reinforcing action of the woven glass fabric.

However, even with two or more woven glass fabric layers being laminated in combination with the fire-resistant coating of the present invention, when test panels of real size, such as a 90×240 cm fire-resistant door panel or partition wall, was subjected to, e.g., a 60 minutes fire test according to JIS A-1304, there were observed at considerably high frequencies burn-through in very limited parts probably due to the low density of the base and reduction of fire-resistant performance due to noticeable delamination of the glass fabric at all the extremities probably due to shrinkage of the glass fiber at high temperatures, though still exerting improved fire-resistance as compared with test panels with no laminate.

On close observation of various test panels after the fire test, the following findings were obtained.

1) The outer surface glass fabric on the heated side suffered from partial breaks, and these parts corresponded to the parts where fire-resistant performance was extremely reduced.
2) The strength of the glass fabric as a whole was reduced to an unmeasurable extent.
3) When high-strength and heavy woven fabric of inorganic fiber, such as carbon fiber and metallic fiber, was used in the test, it could not be held by the intumescence and also failed to follow up heat deformation (warpage) of the test panel and, as a result, sometimes fell off the panel with a considerable accompaniment of the intumescence. Thereafter, burn-through rapidly occurred.
4) Even where the inorganic fiber woven fabric was sufficiently protected by the intumescence or where the fiber underwent no significant reduction in strength at around 1000° C., since the capability of the intumescence in following up the heat shrinkage of the woven fabric is limited, and also since the fabric underwent about 5% shrinkage at all the extremities, the intumescence frequently fell off at the same time even if the above-described local break of the fabric did not occur.
5) Where E type glass fiber, a fire-resistant coating, and heavy and high-strength glass fiber (S type) were laminated without using chopped strands as in Reference Example 13 hereinafter described, the laminated sheet did not melt on heating at around 1000° C. but underwent about 5% heat shrinkage in both of the warp and weft directions, causing reduction in heat resistance of the thus exposed joints and the frame of the panel. This was assumed to be the main cause of the partial reduction of fire-resistant performance.

In order to eliminate these disadvantages of the fire-resistant materials having laminated thereon at least one woven glass fiber fabric layer and the intumescent fire-resistant coating of the present invention, the inventors have conducted a 1–2 hours fire test according to, e.g., JIS A-1304 on materials having laminated thereon inorganic fiber chopped strands, particularly glass fiber chopped strands, and chopped strand mat. The test results revealed the following facts irrespective of the kind of the inorganic fiber used.

1) When a material having laminated thereon chopped strands and the fire-resistant coating of the present invention was subjected to a 2-hour fire test as shown in Example 38, it was found that the chopped strands had included therein a large quantity of the fire-resistant coating on account of their integral shape and accordingly greatly expanded by heating without undergoing shrinkage or melting while maintaining their length. As a result, the individual chopped strands, the original diameter of which was 1 mm or less, formed a layer which hardly fell off, looking like 3 to 6 mm wide tape built in the entire heated surface.
2) The individual chopped strands showed no sign of appreciable melting, crushing or disintegration as was observed with woven glass fabric after heating. Further, the adhesive force between the individual chopped strands and the intumescence was far greater than mere physical adhesion to such a degree that the chopped strands were not removed away by 10 kg/m² of a water pressure applied at a right angle. This adhesive force was markedly improved by addition of the above-described reinforcing inorganic substance for the intumescence.
3) The adhesive force of the chopped strands to the intumescence was somewhat dependent on the adhesive used. For example, use of an adhesive essentially comprising a phenolic resin, a melamine resin, and in some cases, an epoxy resin, and the above-described phosphonate gave extremely strong adhesion and also endowed the foamed layer with a greatly increased compressive force thereby providing a fire-resistant layer having sufficient fall-off resistance against fire-fighting water.
4) When inorganic woven fabric, particularly woven glass fabric, is laminated on a combination of the chopped strands and the fire-resistant coating of the present invention while undried, further improved fire-resistant properties were obtained. In this case, use of a combustible adhesive for laminating a decorative layer, e.g., sliced veneer and decorate plywood, had no adverse influence on the fire-resistant performance.
5) The fire resistant material having laminated thereon the chopped strands in combination with the fire-resistant coating of the present invention proved to have excellent characteristics, such as deterioration resistance and resistance against a heat stream, when continuously heated at a high temperature, e.g., 1300° C. These characteristics could not be observed with inorganic fibers of any other form.

The inventors made the following assumptions to account for the excellent characteristics that are exclusively possessed by chopped strands of inorganic fibers but not by any other form of inorganic fibers.

1) In the case of inorganic fiber paper or nonwoven fabric, since the individual monofilaments are incapable of including therein a necessary amount of a fire-resistant coating, they are melted or disintegrated on heating before the fire-resistant coating is foamed. Moreover, oxides of light metals or alkali metals released from the fused glass fiber react with the Lewis acid produced by the fire-resistant coating on heating to uselessly consume the Lewis acid. As a result, fire-resistant properties of the coating are sometimes reduced.

2) As stated above, inorganic fiber woven fabric holds advantages based on the scaffolding effect upon a fire-resistant coating. However, since the individual yarns are twisted, and the warp and weft are mutually interlocked due to the cross-over structure, permeation of the fire-resistant coating is limited to the surface of the inorganic fiber, and the coating is not impregnated into the inside of the individual filaments. Besides, the interlocking of the yarns prevents the individual yarns from following up the 100-fold or more volumetric expansion of the fire-resistant coating.

3) To the contrary, individual chopped strands are bundles of several hundreds of monofilaments, have no twist, and are free from restraint due to interlocking. Providing that the chopped strands have wettability with a fire-resistant coating to such an extent that they sink rapidly when floated on the surface of a fire-resistant coating, they are laminated and dried to cure while including therein a large amount of the fire-resistant coating by a kind of a physical action like capillary action. Therefore, in the initial stage of fire (300° C. or lower), the chopped strand layer does not directly receive heat and freely expands together with the intumescent fire-resistant coating under no restraint except at binding sites while being completely covered with the fire-resistant coating. The thus expanded chopped strands is completely covered with the intumescence. Thereafter, if the temperature reaches about 1000° C., the intumescence suffers from substantially no weight loss at temperatures above a certain level particularly in the presence of the above-described inorganic additive for intumescence reinforcement. Thus, the tape-like expanded chopped strands and the intumescence form an integral structure. This seems to be a mechanism of manifestation of such specific fire-resistant and heat-insulating properties in the exclusive case of using chopped strands.

The present invention is now illustrated in greater detail with reference to Examples and Reference Examples, but it should be understood that the present invention is not construed as being limited thereto. All the parts and percents are given by weight unless otherwise indicated.

EXAMPLE 1 AND REFERENCE EXAMPLE 1

Preparation of Intumescent Fire-Resistant Coating

The following components were mixed and kneaded in a roll.

| | |
|---|---|
| Resin-13 ("EPICLON 1050-75X" (75% xylol solution)) | 100 parts |
| Resin-14 ("LUCKAMIDE TD-984") | 20 parts |
| Phosphorus Compound-1 ("EXOLIT 462") | 30 parts |
| Foaming Agent-8 | 25 parts |
| Inorganic Compound-1 (average particle size: 1 μm; product of Electro Chemical Industry Co., Ltd.) | 10 parts |
| *-continued* | |
| Xylol (viscosity modifier) | 10 parts |

The resulting intumescent fire-resistant coating had a solids content of 79.6%.

Preparation of Samples

The intumescent fire-resistant coating was coated on each of three aluminum plates of 2 mm thick, 22 cm wide and 22 cm long at a spread of 280 g/m$^2$ (on a solid basis) by means of a brush, preliminarily dried at 100° C. for 20 minutes, and then heat treated at 150° C. for 20 minutes.

Testing

An oxygen-premixed flame of a Méker burner (tip temperature: 1000°±20° C.) was applied to the surface of the coated board for 10 minutes, and the foaming state was observed. Then, the coated board was placed 40 cm below a tap water cock (opening area: 2 cm$^2$), and tap water having a pressure of 10±2 kg/cm$^2$ was applied to the intumescence for 30 seconds to observe any peeling.

For reference, a test was conducted in the same manner, except for using a formulation containing no silicon nitride (Inorganic Compound-4) and taking the difference in concentration into consideration so as to have the same spread.

The intumescence had a thickness of about 6 mm in each case. The result of the heating test showed no significant difference between Example 1 and Reference Example 1. That is, all the samples suffered from neither burn-through of the aluminum plate nor local cracking of the intumescence, the heat insulating effect for prevention of heat conduction to the reverse side was equal in each case, and the surface appearance remained stain-free and semitransparent in each case. However, as a result of the water pressure resistance test, more than half of the intumescence of Example 1 remained on the aluminum plate whereas the intumescence of Reference Example 1 completely fell off within a few seconds.

EXAMPLES 2 TO 3 AND REFERENCE EXAMPLE 2 TO 3

Preparation of Intumescent Fire-Resistant Coating

| | Example 2 | Example 3 | Ref. Example 2 |
|---|---|---|---|
| Phosphorus Compound-1 | 12.8 | 12.8 | 12.8 |
| Resin-5 | 12.8 | 12.8 | 12.8 |
| Dipentaerythritol (carbon source) | 9.5 | 9.5 | 9.5 |
| Foaming Agent-8 | 9.5 | 9.5 | 9.5 |
| Foaming Agent-1 | 2.3 | 2.3 | 2.3 |
| Anionic surface active agent* (dispersing agent) | 1.5 | 1.5 | 1.5 |
| Rutile titanium dioxide fine powder | 4.9 | 4.9 | 4.9 |
| Inorganic Compound-1 (average particle size: 2 μm) | 15.6 | 15.6 | — |
| Silicon dioxide (average particle size: 2 μm) | — | — | 15.6 |

*A sodium salt of a β-naphthalenesulfonic acid-formalin condensate.

The dispersing agent was previously dissolved in a solution of Resin-5 and water, and to the solution were successively added the other components. The mixture was premixed in a mixer and thoroughly kneaded in a roll grinder to prepare an intumescent fire-resistant coating.

Preparation of Samples

A 36 mm thick, 18 mm wide and 900 mm long lauan particle board having a water content of 12±2% and a specific gravity of 0.78 was coated with an intumescent fire-resistant coating having the above formulation (solids content adjusted to 60%) at a coverage of 450 g/m$^2$ and dried at room temperature for 1 day (Examples 2 and Reference Example 2). An emulsion copolymer of vinyl acetate and ethylene having a solid content of 50% was coated thereon as an adhesive at a coverage of about 250 g/m$^2$. While the adhesive was undried, a decorative plywood of JAS decorative plywood grade of the same size but 2.3 mm thick was laid thereon and press bonded at room temperature under a pressure of 4 kg/cm$^2$ for 12 hours.

In Example 3, the same intumescent fire-resistant coating was done, and two sheets of woven glass fabric of plain weave having a weight of 110 g/m$^2$ was laminated between the fire-resistant coating (as adhesive) and the decorative plywood as in the case of Example 2 and Reference Example 2. Each of the thus treated boards and the untreated board of Reference Example 3 was allowed to stand at 20°±3° C. and 60±10% RH for 2 weeks so as to have the same water content.

Testing

Each board was fitted into an iron frame and, after completely filling the gap with incombustible inorganic fiber sheet, subjected to a fire test according to JIS A-1304. The time required until an obvious burn-through to the reverse side (burnt-through time) was observed was measured. After heating was stopped, any warping or cracking of the laminate was examined. The results obtained are shown in Table 2 below.

TABLE 2

|  | Example 2 | Example 3 | Ref. Example 2 | Ref. Example 3 |
|---|---|---|---|---|
| Burnt-through time | 66' 40" | 82' 15" | 37' 25" | 27' 35" |
| Cracking and warpage | slight | very slight | noticeable | greatly noticeable |

EXAMPLES 4 TO 8 AND REFERENCE EXAMPLES 4 TO 7

The specific thermal decomposition behavior of the intumescent fire-resistance coating of the present invention was examined as follows.

Adhesive cloth tape of 1 cm wide was adhered double on a glass plate to make a rectangular casting mold of a given area. An intumescent fire-resistant coating having the same formulation as used in Example 2, except for replacing Inorganic Compound-1 (boron carbide having an average particle size of 2 μm) with each of the inorganic compounds shown in Table 3 below and adding water to adjust to a prescribed solids content, was cast in the mold to a thickness of about 0.5 mm and dried at room temperature for 3 days.

The solids content of each coating formulation was so adjusted that an average of the three measured values of the solids content after 108° C.×2 hour drying was 69.0±1% in average. When each compounding component of the formulation was separately dried at 600° C. for 60 minutes in air, the sum of the residual solids of all the components was 31±0.5% in average of three measurements. The formulation of Example 7 was also adjusted to a solids content of 69.0±1%, but the sum of the residual solids of all the components when separately heated in air at 600° C. for 60 minutes was 14.9±0.5%.

The resulting film was peeled off the glass mold with a knife. The weight of the film thus obtained is shown in Table 3. The film was analyzed by means of a thermobalance to determine a weight retention at a heating temperature up to 1000° C. and also analyzed by differential thermoanalysis (DTA) to determine an exothermic or endothermic peak temperature and its potential difference. DTA was conducted in air at a flow rate of 100 ml/min at a rate of temperature rise of 20° C./min using α-alumina as a reference material. A weight retention (%) was calculated by taking the weight at 100° C. as 100%. The results obtained are shown in Table 4 below.

TABLE 3

| Example No. | Inorganic Compound | Average Particle Size (μm) | Sample Weight (mg) |
|---|---|---|---|
| Example 4 | silicon nitride | 6 | 7.10 |
| Example 5 | boron carbide | 220 (mesh) | 8.60 |
| Example 6 | boron nitride | 9 | 7.98 |
| Example 7 | titanium carbide | 1 | 11.30 |
| Example 8 | tungsten carbide | 0.8 | 8.50 |
| Ref. Example 4 | silicon oxide | porous colloid | 7.40 |
| Ref. Example 5 | coke powder | 10 | 11.20 |
| Ref. Example 6 | graphite powder | 20–50 | 6.20 |
| Ref. Example 7 | none | — | 7.10 |

TABLE 4

| Example No. | Inorganic Compound Added | Weight Retention (%)* | | | | | | | | Exothermic Peak** (Potential Difference: μV) (°C.) |
|---|---|---|---|---|---|---|---|---|---|---|
| | | 300° C. | 400° C. | 500° C. | 600° C. | 700° C. | 800° C. | 900° C. | 1000° C. | |
| Example 4 | silicon nitride | 87.3 | 66.3 | 59.6 | 56.6 | 52.5 | 49.5 | 50.0 | 50.0 | 718 (−4.76) |
| Example 5 | boron carbide | 87.0 | 66.0 | 58.3 | 55.8 | 49.5 | 46.0 | 47.5 | 54.1 | 651 (−3.09) 857 (−7.43) |
| Example 6 | boron nitride | 86.2 | 67.7 | 60.8 | 57.7 | 50.1 | 49.6 | 49.3 | 49.3 | 647 (−4.37) |
| Example 7 | titanium carbide | 90.3 | 74.8 | 69.8 | 67.8 | 64.8 | 67.2 | 74.2 | 76.6 | 809 (180.9) |

TABLE 4-continued

| Example No. | Inorganic Compound Added | Weight Retention (%)* | | | | | | | | Exothermic Peak** (Potential Difference: μV) |
|---|---|---|---|---|---|---|---|---|---|---|
| | | 300° C. | 400° C. | 500° C. | 600° C. | 700° C. | 800° C. | 900° C. | 1000° C. | (°C.) |
| Example 8 | tungsten carbide | 87.3 | 65.0 | 57.5 | 55.0 | 49.0 | 50.5 | 50.5 | 50.5 | 662 (8.28) |
| Reference Example 4 | silicon oxide | 82.2 | 58.9 | 53.3 | 46.4 | 43.6 | 43.6 | 43.0 | 42.9 | none (incapable of film forming and of no practical use) |
| Reference Example 5 | coke powder | 85.6 | 65.1 | 58.4 | 55.4 | 43.3 | 17.6 | 17.4 | 17.3 | 736 (14.82) |
| Reference Example 6 | graphite powder | 87.6 | 68.4 | 61.5 | 58.6 | 51.3 | 41.3 | 27.3 | 27.6 | 859 (2.03) |
| Reference Example 7 | none | 84.9 | 57.6 | 46.6 | 44.2 | 36.3 | 33.3 | 33.2 | 33.3 | 653 (−5.87) |

Note
*The weight at 100° C. was taken as 100%.
**Noticeable peaks observed above 500° C.

It is apparent from the results in Table 4 that the intumescent fire-resistant coating according to the present invention exhibits excellent weight retention properties in high temperatures as compared with the reference samples.

Each of the above prepared coatings was coated on a 12 mm thick lauan JAS II plywood at a coverage of 275±5 g/m$^2$ (on a solid basis) and dried at 60° C. for 20 minutes. The coated plywood was held vertically in a combustion chamber made of a non-combustible inorganic substance, and an oxygen-premixed flame whose tip temperature was kept at 1250°±50° C. was applied at a right angle onto the coated surface over an area of 300 cm$^2$. The burn-through time (the time required until a burn-through to the reverse side was visually observable) was measured three times per sample. The appearance of the coated film and the characteristics of the foamed heat-insulating layer were also observed. The results obtained are shown in Table 5 below. It was confirmed that the fire-resistant performance of the coated plywood had a close correlation with the weight retention in high temperatures of 900° C. or more shown in Table 4.

TABLE 5

| Example No. | Appearance of Coating Film | Characteristics of Foamed Heat-Insulating Layer | Burn-Through Time |
|---|---|---|---|
| Example 4 | white | dense, no void inside | 35' 16" |
| Example 5 | black | " | 39' 07" |
| Example 6 | white | " | 36' 02" |
| Example 7 | black | " | 45' 30" |
| Example 8 | black | " | 38' 01" |
| Reference Example 4 | white foam | not tested | — |
| Reference Example 5 | black | " | 11' 57" |
| Reference Example 6 | black | " | 13' 44" |
| Reference Example 7 | white | " | 22' 22" |

EXAMPLES 9 TO 13 AND REFERENCE EXAMPLE 8

In order to confirm that the inorganic compounds used in Examples 4 to 8 produce similar effects when formulated with different phosphorus compounds or synthetic resins, intumescent fire-resistant coatings were prepared from the following formulation. A cast film of each coating was analyzed in the same manner as in Example 4. The results obtained are shown in Table 6 below.

Intumescent Fire-Resistant Coating Formulation (Wt % of Solid Content)

| | |
|---|---|
| Resin-3 ("PLYOPHEN TD-2443LV") | 30% |
| Phosphorus Compound-3 | 3% |
| Phosphorus Compound-2 | 10% |
| Resin-2 (ROOF-PROOF FIX") | 15% |
| p-Toluenesulfonic acid | 4% |
| Inorganic compound (see Table 6) | 10% |

Each formulation had a solids content of 72% and contained 28% of water/methanol (1:1) as a volatile content. The formulation of Reference Example 8 contained no inorganic compound and had a solids content adjusted to 72%. When the formulation of Examples 9 to 13, which is cold-setting, is coated on a wood-based material, such as particle boards and plywood, exhibits excellent effects to prevent crazing of the coated surface on continuous and high temperature heating and is therefore useful as a fire-resistant undercoat in double coating. As shown in Table 6, each of the inorganic compounds to be used in the present invention proved to have weight retention properties on continuous heating in high temperatures, though different in degree depending on the kind.

TABLE 6

| Example No. | Inorganic Compound Added | Weight Retention (%)* | | | | | | | | Exothermic Peak** (Potential Difference: μV) |
|---|---|---|---|---|---|---|---|---|---|---|
| | | 300° C. | 400° C. | 500° C. | 600° C. | 700° C. | 800° C. | 900° C. | 1000° C. | (°C.) |
| Example 9 | silicon | 91.7 | 74.8 | 66.4 | 57.9 | 40.6 | 28.8 | 28.7 | 29.1 | 682 (22.46) |

TABLE 6-continued

| Example No. | Inorganic Compound Added | Weight Retention (%)* | | | | | | | | Exothermic Peak** (Potential Difference: μV) (°C.) |
| --- | --- | --- | --- | --- | --- | --- | --- | --- | --- | --- |
| | | 300° C. | 400° C. | 500° C. | 600° C. | 700° C. | 800° C. | 900° C. | 1000° C. | |
| Example 10 | boron nitride carbide | 91.3 | 82.5 | 73.1 | 62.8 | 55.6 | 45.4 | 38.3 | 43.7 | 721 (1.64) 897 (3.34) |
| Example 11 | boron nitride | 89.7 | 79.7 | 69.6 | 57.9 | 37.6 | 25.0 | 24.6 | 25.0 | 676 (30.79) |
| Example 12 | titanium carbide | 91.3 | 83.3 | 73.9 | 65.3 | 42.8 | 33.6 | 35.4 | 33.1 | 680 (43.00) 868 (−5.68) |
| Example 13 | tungsten carbide | 91.6 | 80.2 | 71.3 | 63.1 | 55.7 | 44.3 | 37.4 | 33.5 | 777 (18.30) |
| Reference Example 8 | none | 90.0 | 76.8 | 66.7 | 56.2 | 51.9 | 38.2 | 27.7 | 13.6 | 535 (10.41) 741 (3.25) |

Note:
*The weight at 100° C. was taken as 100%.
**Noticeable peaks observed above 600° C.

| | |
| --- | --- |
| Phosphorus Compound-1 | 20% |
| Resin-11 ("BURNOCK DM-652") | 40% |
| Inorganic Compound-2 | 16% |
| Foaming Agent-8 | 20% |
| Foaming Agent-6 | 4% |

The above components were mixed at a ratio shown (on a solid basis) and kneaded together with toluene in a roll to prepare a black intumescent fire-resistant coating. The coating was coated on a 2 mm thick steel plate at a coverage of about 250 g/m² (on a solid basis). The coated layer completely cured with humidity in air within a few days. On application of a flame at 1000° C. at a right angle, the coated layer rapidly expanded to form a uniform and hard black intumescence having a thickness of about 2 cm. Even on continuing the heating for 60 minutes, the intumescence did not fall off due to the heat stream and exerted excellent heat-insulating properties in preventing the reverse side temperature from rising to about 260° C. or higher.

EXAMPLES 15 TO 36 AND REFERENCE EXAMPLES 9 TO 11

Preparation of Intumescent Fire-Resistant Coating

| | |
| --- | --- |
| Phosphorus Compound-2 ("ROOF-PROOF P") | 24 parts |
| Phosphorus Compound-1 ("EXOLIT 462") | 30 parts |
| Resin-2 ("WATERSOL S-695", 70% polymethylol melamine) | 40 parts |
| Acid monoethanolamine sulfate (acid catalyst) | 4 parts |
| Low-molecular weight sodium polyacrylate (dispersing agent) | 1 part |
| Inorganic compound (see Table 7 below) | 2 parts |

An intumescent fire-resistant coating was prepared from the above components. The pH was adjusted to about 4.5. All the inorganic additives used here were commercially available products having an average particle size of not more than 5 μm. The coating formulation of Reference Example 9 contained no inorganic compound.

Preparation of Samples

A 6% aqueous solution of polyvinyl alcohol (degree of polymerization: 1700; saponification degree: 88%) was coated on a sliced veneer layer of a 12 mm thick 20-by-20 cm square lauan plywood of JAS II at a coverage of 100 g/m² and dried at 60° C. for 10 minutes to form a primer coat for uniformalization of chemical reactivity of the surface. Then, each of the above prepared coatings was applied twice to the primer coat to a total solid content of 260 g/m² by means of a brush, dried at 60° C. for 30 minutes for each coating operation, followed by aging at room temperature for 7 days. Five coated samples were prepared per each coating formulation.

The resulting coated plywood was horizontally placed in a refractory furnace of horizontal heating system (outer size: 30×30 cm) formed of 5 cm thick slabs of lightweight porous reinforced calcium silicate with its coated side down. The sample size and the inner size of the furnace were equal so that the sample was in close contact with the furnace inner wall. An air-premixed propane flame was applied to the central 10×10 cm portion of the lower side of the sample for 15 minutes. While the temperature of the coated side was 1000°±50° C., it was expected that the sample was under considerable influences of the radiation heat from the furnace. After the heating, the compressive strength of the intumescence was measured, and the shape of the intumescence and carbonization or discoloration of the reverse side were observed. The results obtained are shown in Table 7 below.

Measurement of the compressive strength was carried out as follows. An aluminum plate weighing 100 g and having the same size as the sample was put on the intumescence to collapse small local projections to flatten the surface. An increasing load was applied to the aluminum plate, and the minimum load (g/m²) under which the intumescence was broken was obtained as an average of 5 measurements.

For the sake of reference, an uncoated plywood was similarly tested.

TABLE 7

| Example No. | Inorganic Compound | Foamed Layer | | Compressive Strength (g/m²) | Back Side Appearance |
| --- | --- | --- | --- | --- | --- |
| | | Thickness (mm) | State | | |
| Reference | uncoated | — | — | — | burn-through |

TABLE 7-continued

| Example No. | Inorganic Compound | Foamed Layer Thickness (mm) | State | Compressive Strength (g/m²) | Back Side Appearance |
|---|---|---|---|---|---|
| Example 9 Reference | none | 20 | cracked | 3.6 | considerably blackened |
| Example 10 Reference Example 11 | SiO$_2$ | disintegrated and fell off due to lack of strength | | — | considerably blackened |
| Example 15 | B$_4$C | 27 | dense | 33.7 | no change |
| Example 16 | MoC | 22 | dense | 29.8 | no change |
| Example 17 | ZrC | 24 | dense | 33.0 | no change |
| Example 18 | VC | 21 | dense | 28.9 | no change |
| Example 19 | NbC | 22 | dense | 29.0 | no change |
| Example 20 | TaC | 25 | dense | 23.2 | no change |
| Example 21 | TiB$_2$ | 22 | dense | 18.2 | slightly discolored |
| Example 22 | ZrB$_2$ | 26 | dense | 19.0 | slightly discolored |
| Example 23 | TaB$_2$ | 26 | dense | 15.0 | slightly discolored |
| Example 24 | CrB | 17 | slightly cracked | 13.9 | slightly discolored |
| Example 25 | MoB | 20 | dense | 15.8 | slightly discolored |
| Example 26 | WB | 26 | dense | 20.0 | no change |
| Example 27 | ZrSi$_2$ | 19 | dense | 19.3 | no change |
| Example 28 | CrSi$_2$ | 22 | dense | 18.8 | no change |
| Example 29 | WSi$_2$ | 24 | dense | 19.6 | no change |
| Example 30 | MoSi$_2$ | 22 | dense | 21.0 | no change |
| Example 31 | TiN | 20 | slightly cracked | 12.6 | no change |
| Example 32 | ZrN | 19 | dense | 11.9 | no change |
| Example 33 | NbN | 20 | dense | 16.0 | slightly discolored |
| Example 34 | TaN | 23 | slightly cracked | 18.5 | slightly discolored |
| Example 35 | WC—TiC (50/50) | 23 | dense | 30.3 | no change |
| Example 36 | WC—TiC—TaC (50/30/20) | 22 | dense | 34.6 | no change |

The results in Table 7 reveal the extremely specific effects of the inorganic additives, inter alia, carbides in reinforcing the intumescence.

EXAMPLE 37 AND REFERENCE EXAMPLE 12

Preparation of Intumescent Fire-Resistant Coating

| | |
|---|---|
| Resin-13 ("EPICLON 1050-75X") (75% xylol solution)) | 100 parts |
| Resin-14 ("LUCKAMIDE TD-984") | 20 parts |
| Phosphorus Compound-1 ("EXOLIT 462") | 30 parts |
| Foaming Agent-8 (product of Nissan Chemicals Industries, Ltd.) | 25 parts |
| Inorganic Compound-4 (average particle size: 5 μm) | 10 parts |
| Xylol (viscosity modifier) | 10 parts |

The above components were mixed and dispersed in a mixing machine at 4000 rpm for 5 minutes to prepare an intumescent fire-resistant coating for comparative testing in Reference Example 12. The resulting coating had a solids content of 79.6%.

Further, an intumescent fire-resistant coating for use in Example 37 was prepared in the same manner, except for additionally using 10 parts of chopped strands having a cut length of 12 mm and a weight of 350 g/m² and taking the difference in concentration into consideration so as to have the same coverage in the following testing.

Testing

A 2 mm thick, 22 cm wide, and 22 cm long aluminum plate having 1 mm deep and 2 mm wide grooves at 40 mm intervals in both longitudinal and transverse directions by embossing was coated with each of the above prepared coatings at a coverage of 280 g/m² (on a solid basis) by means of a brush, and the coated layer was preliminarily dried at 100° C. for 20 minutes and then heat treated at 150° C. for 20 minutes. Three coated samples were prepared per each coating formulation.

An oxygen-premixed propane flame of a turbo-jet burner (flame tip temperature: 1300°±20° C.) was applied to the coated surface, and the foaming state and burn-through were observed. As a result, the intumescence thus formed had a thickness of about 8 mm in Reference Example 12 and about 12 mm in Example 36. In either case, foaming took place rapidly on heating. However, the intumescence of Reference Example 12 suffered from considerable unevenness or cracking while continuing the heating, and a burn-through was observed at the cracked part in 13 minutes and 16 seconds. No burn-through was observed in the sample of Example 37 even at 60 minutes heating.

Then, the intumescence was placed 40 cm below a tap water cock (opening area: 2 cm²), and tap water having a pressure of 10±2 kg/cm² was applied to the intumescence for 30 seconds. As a result, the extent of fall-off of the intumescence was negligible in Example 37, whereas the intumescence of Reference Example 12 fell off at the cracked part to a considerable extent.

EXAMPLE 38 AND REFERENCE EXAMPLE 13

Preparation of Adhesive

A fire-resistant and cold-setting adhesive having a concentration of 63% was prepared from the following components.

| | |
|---|---|
| 70% Aqueous solution of Phosphorus Compound-2 ("ROOF-PROOF P") | 20 parts |
| 70% Aqueous solution of Resin-2 | 20 parts |

-continued

| | |
|---|---|
| ("ROOF-PROOF FIX") | |
| 60% Aqueous solution of phenolic resin ("PLYOPHEN TD-2443LV") | 50 parts |
| 50% Methanol solution of p-toluene-sulfonic acid | 10 parts |

Preparation of Intumescent Fire-Resistant Coating

| | |
|---|---|
| Phosphorus Compound-2 ("ROOF-PROOF P") | 250 parts |
| Resin-2 ("ROOF-PROOF FIX") | 445 parts |
| Low-molecular weight sodium poly-acrylate (dispersing agent; 530 poise; product of Kao Corp.) | 1 part |
| Inorganic Compound-2 (average particle size: 1 μm; product of Tokyo Tungsten K.K.) | 50 parts |
| Phosphorus Compound-1 ("EXOLIT 462") | 200 parts |
| Ammonium hydrogensulfate aqueous solution ($SO_4$ content: 20 g/kg) | 50 parts |

The above components were charged in an acid proof flat-bottomed round container in the order listed, and the mixture was stirred in a mixing machine at about 4000 rpm for 10 minutes, followed by filtering through a 100 mesh metal net to prepare an intumescent fire-resistant coating having a solids content of 75.1% and a pH of 4.1 (25° C.).

Preparation of Samples

A stile of 10 cm wide and 36 mm thick made of high-hardness apitong was joined with each side of a 36 mm thick lauan particle board (water content: 12±2%) by a tongue-and-groove joint to prepare a panel for fire-resistant door. A stainless steel-made door handle case having a thickness of 20 mm was inserted in the panel, and inorganic refractory cement was applied thereon. After setting, uneven parts were smoothed by means of a sander, and a 6% polyvinyl alcohol aqueous solution was coated thereon at a coverage of 80 g/m², followed by drying.

The above prepared fire-resistant and cold-setting adhesive was then applied to a coverage of 180 g by means of a hand roller, and immediately thereafter, woven glass fabric of plain weave having a weight of 230 g/m² (Reference Example 13) or a chopped strand mat of the same weight (Example 38) was laminated thereon. The laminate was allowed to stand at room temperature for 2 hours for hardening.

Then, the above prepared intumescent fire-resistant coating was coated on the chopped strand mat or woven glass fabric with a hand roller to a coverage of 750 g/m². While the fire-resistant coating was wet, the same E type woven glass fabric as used above (Example 38) or high-strength woven glass fabric (s type) having a weight of 400 g/m² (Reference Example 13) was laminated thereon. The oozing fire-resistant coating on the woven fabric was leveled by light brushing so as to make the entire surface uniformly wet. The thus coated layer was dried at 27° C. for about 2 hours until the surface became tack-free.

An ethylene-vinyl acetate copolymer emulsion having a concentration of 53% and an ethylene to vinyl acetate weight ratio of 18/82 ("EVADIC EP-11" produced by Dainippon Ink & Chemicals, Inc.) was coated on the woven fabric layer at a coverage of 600 g/m² with a hand roller and, while the adhesive was undried, a 2.3 mm thick 3-ply decorative plywood of the same size was laminated thereon under a pressure of 4 kg/m² for 12 hours.

The opposite side of the door panel was also treated in the same manner as described above to prepare a 45 mm thick panel having laminations on both sides thereof. A groove was made along the center line of the side surface of the four stiles to a width of 20 mm and a depth of 3 mm.

The same intumescent fire-resistant coating as used above was filled in the groove of the sample of Reference Example 13 to slightly above the brim, followed by curing for 24 hours. The cured layer was flattened by sanding, and a 1.0 mm thick decorative wood-based facing for rails and stiles was laminated thereon using the above-described ethylene-vinyl acetate copolymer emulsion as an adhesive at a coverage of 500 g/m².

The four sides (stiles) of the panel of Example 38 were treated in the same manner as in Reference Example 13, except for using a pasty fire-resistant coating for filling the groove, said pasty fire-resistant coating being prepared by incorporating 4 parts of 3 mm long chopped strands into the above-described fire-resistant coating formulation.

Each of the resulting fire-resistant door panels was fitted with a stainless steel-made door handle, a key, a key hole, and hinges. Chromel-alumel thermocouples for determining the temperature on the reverse side opposite to the heating side at 12 sites and those for determining the temperature inside the heating furnace were connected to a data logger.

A fire test on the door panels was conducted according to JIS A-1304. That is, the door panel was fitted into an iron-made door panel retainer with a 5 mm gap each at the upper and lower parts, and the retainer was fixed to an iron-made retainer frame. All the surfaces except on the sample panel were covered with a 50 mm thick aluminum silicate fiberboard, any gap was sealed with refractory cement, and the sample panel was fixed in a refractory test furnace.

The sample of Reference Example 13 revealed a mild temperature rise in 11 out of 12 thermocouples. The temperature rise in one thermocouple was rapid, and the reverse side of the sample reached 260° C. within 60 minutes and 33 seconds from the commencement of heating. It was considered that the panel base had had a low density only in this site. Heating was stopped after 61 minutes and 33 seconds from the commencement of heating, at which leaks of smoke and flames due to 50 mm long warpage at the upper part of the sample were visually observed. At this point, the other thermocouples gave an indication of 135° C. in average.

On close observation of the tested sample, it was found that the part of the woven glass fabric corresponding to the back side having reached 260° C. suffered from breaks, which caused deep cracks and delamination of the foamed layer thereby losing heat resistance. The noticeable warpage of the sample was judged attributed to increased heat conduction arising from fall-off of the intumescence resulting from about 5% heat shrinkage of the woven glass fabric in both longitudinal and transverse directions. The char depth at 20 sites of the sample was 37 mm in average.

The sample of Example 38 kept its back side temperature at 140° or lower at any site of measurement and the length of warpage was about 10 mm at the longest even after 90-minutes heating. As is was obvious that the sample would pass the examination of 60 minutes-fire test, the heating was stopped, the sample was removed from the furnace, and the heated side was examined. As a result, the surface woven glass fabric suffered from breaks of 20 cm or less wide. However, examination of the intumescence under the surface woven glass fabric revealed that the glass fiber chopped strands, which were supposed to have melted at around 300° C., had largely expanded and were complicatedly crossing with each other in the intumescence. It was thus proved that the overall surface of the sample inclusive of the wood-based frame was protected against heat conduction and that high strength resistance against-peel was imparted to the intumescence. The char depth was 20 mm in average.

EXAMPLE 39

A sample panel was prepared in the same manner as in Example 38, except that the chopped strand mat was not laminated and, instead, a chopped strand-containing intumescent fire-resistant coating prepared by incorporating 4% of chopped strands of 6 mm in cut length into the same fire-resistant coating as used in Example 38 was directly coated on the base with a brush and a hand roller at a coverage of 800 g/m².

When the sample was subjected to the same fire test as in Example 38 for a heating time of 75 minutes, neither burn-through nor leak of smoke to the reverse side was observed, but the gap between the sample and the iron retainer frame due to warpage gradually increased. Because leakage of smoke and flames from the gap was visually observed, the heating was stopped.

As a result of examination of the sample taken out of the furnace, while the intumescence reinforced by the chopped strand was found remaining on the entire surface of the sample without suffering from any apparent damage, the woven glass fabric outer layer was found mostly disintegrated due to heat, whitened, broken into fragments without melting, and considerably fallen off the sample. The char depth was 25 mm.

From these observations, it is seen that formation of such a specific intumescence, which keeps a close contact with the base in a highly expanded state without undergoing melting or shrinkage, would be the main reason for the extremely excellent fire-resistant performance of the sample.

EXAMPLES 40 AND 41 AND REFERENCE EXAMPLE 14

Three 33 m thick laminated door panels were prepared in the same manner as in Example 38 or Reference Example 13, except for replacing the particle board with two thicknesses of a 12 mm thick JAS class II plywood (total thickness: 24 mm).

In each case, the fire-resistant adhesive was not coated. The same intumescent fire-resistant coating formulation as used in Example 38 or Reference Example 13 was used, except that tungsten carbide was replaced with the same amount of silicon carbide in Example 40, no inorganic compound was used in Example 41 and Reference Example 14, and 5 parts of chopped strands of 50 mm in cut length were incorporated into the coating in Examples 40 and 41. The fire-resistant coating was coated directly on each panel also as adhesive by means of a flow coater at a coverage of 700 g/m². The same woven glass fabric as used in Example 38 was then laminated on the entire coated surface.

The thus prepared sample was tested according to JIS A-1304 in the same manner as in Example 38 and Reference Example 13.

In the case of Reference Example 14, the gap between the sample and the frame gradually increased due to about 40 mm long warpage appearing on the upper part of the frame at about 21'15" heating, subsequently followed by crackles caused by delamination of the plywood. At 23'15" heating, at which flames from the gap were seen, the heating was stopped. The char depth from the surface was about 28 mm in average.

In the case of Example 41, the warpage in the upper part of the frame reached about 30 mm at about 39 minutes heating, subsequently followed by crackles. At 42'30" heating, at which flames were seen from the reverse side of the sample, the heating was stopped. The char depth was about 23 mm in average.

In the case of Example 40, the warpage in the upper part of the frame reached about 30 mm at about 39 minutes heating, subsequently followed by crackles. The heating was stopped at 42'30" heating, at which flames were seen from the reverse side of the sample. At this point, no burn-through was observed. The char depth was about 24 mm in average.

EXAMPLE 42 AND REFERENCE EXAMPLE 15

Plasterboards used in the so-called 2-by-4 construction of plasterboard-framed wooden houses undergo considerable warpage, shrinkage or cracking at the joints on fire or when heated at around 1000° C. and, to cause gaps at the joints. This disadvantage has been pointed out in the art to be a weak point of 2-by-4 construction.

The following testing is to examine the fire-resistant properties of plasterboards having coated on the side surfaces thereof (the parts to be joined) a phosphorus- and nitrogen-containing fire-resistant coating containing glass fiber chopped strands.

Intumescent Fire-Resistant Coating Formulation (on Solid Basis)

| | Example 42 (wt %) | Reference Example 15 (wt %) |
|---|---|---|
| Ammonium polyphosphate (product of Hoechst Japan Co., Ltd.) | 12.8 | 12.8 |
| Plasticized vinyl acetate resin emulsion copolymer (product of Dainippon Ink & Chemicals, Ind.) | 12.8 | 12.8 |
| Dipentaerythritol (carbon source) | 9.5 | 9.5 |
| Azodicarbonamide (product of Eiwa Kasei Kogyo K.K.) | 2.3 | 2.3 |
| Isocyanuric acid powder (product of Shikoku Kasei Co., Ltd.) | 9.5 | 9.5 |
| Sodium polyacrylate oligomer (40% aqueous solution) | 1.5 | 1.5 |
| Rutile titanium dioxide fine powder | 4.9 | 4.9 |
| Boron carbide (product of Electro Chemical Industry Co., Ltd.) | 5.0 | 5.0 |
| Chopped strands (3 mm) (product of Nitto Boseki Co., Ltd.) | 40.0 | — |

The above components except chopped strands were sufficiently kneaded together with water in a roll grinder to prepare an intumescent fire-resistant coating having a solids content of 60%. Chopped strands were then mixed therewith in a mixing machine.

The resulting coating was coated with a brush on the four sides of a 12 mm thick, 15 cm wide and 30 cm long plasterboard (from which the paperboard for strength retention had been removed) at a coverage of 400 g/m² and dried at room temperature for 12 hours. Two plasterboards thus treated were butted to make a 30 cm square in such a manner that the gap in the butt-seam was not so appreciable but was visible when held to the light. The joined plasterboards were backed with a 8 mm thick calcium silicate board (30×30 cm) and fixed with clips to prepare a sample (30×30×20 mm (t)). Ten samples were prepared for each fire-resistant coating formulation. The sample was put in a heating furnace of the same size, and the side having the butt-seam was heated according to JIS A-1304.

In Reference Example 15, the rate of temperature rise on the back of the butt-seam showed large scatter among the ten samples depending on the extent of foaming of the fire-resistant coating layer. That is, the time required for the temperature to reach the prescribed temperature, 260° C., widely varied from 25'15" to 58'03", giving an average value of 48'34". All the samples were judged defective. The greatest cause of such a large variation of fire-resistant performance is believed to consist in unevenness of the cut surface of the plasterboard.

To the contrary, in Example 42, the chopped strands rapidly and greatly expanded on heating to produce high heat-insulation effects on the cut surface, and none of the ten samples' reverse sides reached 260° C. within 2 hours from the commencement of heating. The fire-resisting technique of Example 42 was therefore judged practical and more efficient than the conventionally employed so-called taper finishing in place.

EXAMPLES 43 TO 63 AND REFERENCE EXAMPLES 16 TO 18

A 9 mm thick constructional plasterboard specified in JIS A 6901-83 was cut to a width of 15 cm and a length of 30 cm. The untreated cut boards were used as such in Reference Example 16.

The following components were thoroughly kneaded in a ball mill to prepare a white intumescent fire-resistant coating. The solids content of the coating was adjusted to 55% by addition of water.

Intumescent Fire-Resistant Coating Formulation

| | |
|---|---|
| Water | 10 parts |
| 50% Vinyl acetate-ethylene copolymer emulsion | 30 parts |
| Butyl carbitol acetate (film formation accelerator) | 3 parts |
| 30% Low-molecular weight sodium polyacrylate (dispersing agent) | 3 parts |
| Dipentaerythritol (carbon source) | 15 parts |
| Melamine powder (foaming agent and nitrogen source) | 15 parts |
| Phosphorus Compound-1 ("EXOLIT 462") | 20 parts |
| Rutile titanium oxide (phosphorus and-nitrogen source) | 4 parts |

The resulting intumescent fire-resistant coating was uniformly coated with a brush on the plasterboard through the surface paperboard thereof at a coverage of 220 g/m² (on a solid basis) and completely dried at 80° C. to prepare a sample for Reference Example 17.

A sample of Reference Example 18 was prepared in the same manner as in Example 17, except that the intumescent fire-resistant coating further contained 5% of boron nitride.

A sample for Example 43 was prepared by coating the same fire-resistant coating as in Reference Example 17 and, before drying, by laminating a chopped strand mat made of E glass fiber having been treated with silicone (basis weight: 230 g/m²; fiber length: 50 mm; product of Nitto Boseki Co., Ltd.) on the above obtained coated sample, followed by completely drying at 80° C.

Samples for Examples 44 to 63 were prepared in the same manner as in Example 43, except that the intumescent fire-resistant coating further contained an inorganic compound as shown in Table 8 below.

In each test samples, the coating amount of the fire-resistant coating was the same as that of Reference Example 17.

Three samples were prepared for each Example.

Each sample was placed in a box covered with a foamed calcium silicate heat insulating board so as to increase the thermal stress caused by radiant heat on heating. The sample was heated by vertically applying a flame using a turbo-jet burner in the same manner as in Example 36. The time required for the paperboard on the reverse side of the plasterboard to change its color from blue slightly to yellow (charring time) and the time required for any small crack to develop (cracking time) on further heating were measured. An average of the measured values of 3 samples was obtained. The results obtained are shown in Table 8. The results in Table 8 proved improvement in fire-resistant performance properties obtained by the method of the present invention, and particularly by using the specific inorganic compound in the fire-resistant coating.

TABLE 8

| Example No. | Laminating and Inorganic Compound | Amount of Inorganic Compound* (%) | Charring Time | Cracking Time |
|---|---|---|---|---|
| Reference Example 16 | no laminating, no coating | — | 3' 38" | 4' 05" |
| Reference Example 17 | coating only | — | 4' 24" | 4' 55" |
| Reference Example 18 | BN, no laminating | 5 | 4' 45" | 5' 05" |
| Example 43 | laminating only, no inorganic compound | — | 5' 24" | 5' 50" |
| Example 44 | SiC | 1 | 6' 32" | 7' 00" |
| Example 45 | SiC | 5 | 7' 40" | 8' 43" |
| Example 46 | TiC | 1 | 8' 29" | 9' 27" |
| Example 47 | Mo₂C | 1 | 8' 45" | 9' 40" |
| Example 48 | CrC | 1 | 8' 55" | 9' 36" |
| Example 49 | VC | 1 | 8' 06" | 8' 32" |
| Example 50 | NbC | 1 | 8' 46" | 9' 29" |
| Example 51 | TaC | 1 | 8' 04" | 8' 19" |
| Example 52 | TiB₂ | 2 | 6' 46" | 7' 30" |
| Example 53 | TiB₂ | 5 | 7' 46" | 8' 30" |
| Example 54 | MoB | 2 | 7' 23" | 8' 11" |
| Example 55 | WB | 2 | 7' 51" | 8' 26" |
| Example 56 | ZrSi₂ | 2 | 8' 11" | 9' 00" |
| Example 57 | MoSi₂ | 2 | 8' 38" | 9' 15" |
| Example 58 | CrSi₂ | 1 | 8' 00" | 8' 49" |
| Example 59 | TiN | 2 | 9' 05" | 9' 42" |
| Example 60 | VN | 1 | 8' 05" | 8' 28" |
| Example 61 | NbN | 1 | 7' 50" | 8' 38" |
| Example 62 | WC/TiC (50/50) | 1 | 9' 24" | 10' 09" |
| Example 63 | WC/TiC/TaC (50/30/20) | 1 | 8' 54" | 9' 33" |

The effects of the intumescent fire-resistant coating according to the present invention are summarized below.

1) Conventional intumescent fire-resistant coatings comprising a phosphorus compound, a synthetic resin, an organic foaming agent, etc. are disadvantageous in that the intumescence obtained therefrom shows a high rate of weight loss when continuously heated at a high temperature, e.g., 800° C. or higher. The intumescent fire-resistant coating of the present invention is effective to retard the weight loss thereby postponing the burn-through time of a combustible base and reducing heat conduction to the base, such as inorganic salt molded articles (e.g., plasterboards and calcium silicate boards) which rapidly lose strength at high temperatures and metals.

2) The intumescent fire-resistant coating of the present invention prevents foams to provide an intumescence having a high density and a high specific gravity while suppressing formation of giant voids as observed with the conventional coatings. The intumescence retains such excellent characteristics for a prolonged period of time even under heating in high temperatures of around 1000° C. and is therefore prevented from delamination or fall-off caused by a heat stream.

3) Even where a decorative layer, such as a decorative plywood, is laminated on the intumescent fire-resistant coating of the present invention applied to a wood-based fire-resistant door panel, the intumescence exhibits high compressive strength to retain its fire-resistant properties.

4) The inorganic compound used in the intumescent fire-resistant coating of present invention has a matte effect and a coloring effect to give a white color, a yellow color, a black color, etc.

5) The intumescent fire-resistant coating of the present invention also functions as an adhesive or a decorative coating while retaining the above-described characteristics.

The effects of the combined use of the intumescent fire-resistant coating and chopped strands are summarized below.

1) A combination of an intumescent fire-resistant coating comprising a phosphorus- and nitrogen-containing compound, a synthetic resin, an organic foaming agent and, if desired, an inorganic compound and glass fiber chopped strands, laminated on a metallic material, an inorganic material, a wood-based material, or an organic material, forms a firm foamed heat-insulating layer at an extremely high rate of expansion even when continuously heated at a high temperatures of 1000° C. or more thereby reducing the thermal conductivity of the base. As a result, melting, deformation, gap formation, weight loss, cracking, bursting, and burn-through are significantly retarded or inhibited.

2) Where inorganic fabric, such as glass fiber fabric, is laminated on the above-described coated base, (i) a smooth surface can be obtained, (ii) poor appearance due to projection of the chopped strand can be improved, (iii) lamination of a decorative layer becomes easier, (iv) reduction in fire-resistant properties caused by coating of a combustible adhesive or paint directly on the fire-resistant coating layer can be avoided, and (v) it is made feasible to apply or laminate a different kind of a fire-resistant adhesive, a decorative layer, or a fire-resistant coating.

3) Laminating operations can be performed in a factory beforehand, requiring no in-situ working which has low production efficiency and is likely to involve quality control problems.

4) The combined use of chopped strands can be applied to an extremely broad range of materials requiring fire-resistance and fire-resistant coating formulations to thereby make a great contribution to improvements in fire-resistant properties and reliability.

5) The above-described advantages make it possible to reduce thickness or weight of fire-resistant materials.

6) The present invention may be carried out at ambient temperature without always requiring a heating step.

While the invention has been described in detail and with reference to specific examples thereof, it will be apparent to one skilled in the art that various changes and modifications can be made therein without departing from the spirit and scope thereof.

What is claimed is:

1. An intumescent fire-resistant coating essentially comprising (A) at least one inorganic compound selected from the group consisting of a carbide, boride, nitride, carbonitride, or carboboride of titanium, zirconium, vanadium, niobium, tantalum, molybdenum, tungsten, or chromium and a carbide, nitride or carbonitride of boron, (B) a synthetic resin, and (C) at least one phosphorus and/or sulfur compound capable of forming a Lewis acid on heating, wherein said inorganic compound is present in an amount of 20% by weight of the coating or less.

2. An intumescent fire-resistant coating as claimed in claim 1, wherein said coating further contains at least one organic foaming agent having a decomposition temperature of from 100° to 400° C.

3. An intumescent fire-resistant coating as claimed in claim 2, wherein said organic foaming agent is selected from azodicarbonamide, azobisisobutyronitrile, N,N'-dinitrosopentamethylenetetramine, 4,4'-hydroxybisbenzenesulfonyl hydrazide, p-toluenesulfonyl hydrazide, p,p'-hydroxybis(benzenesulfonyl hydrazide), hydrazodicarbonamide, melamine, a melamine condensate, a urea condensate, isocyanuric acid, and an isocyanuric acid condensate.

4. An intumescent fire-resistant coating as claimed in claim 1, wherein said phosphorus compound capable of forming a Lewis acid on heating is selected from ammonium polyphosphate, synthetic resin-encapsulated ammonium polyphosphate, a 3-(dialkylphosphono)propionamide having not more than 3 carbon atoms in the alkyl group thereof or a methylolated or methoxymethylated compound thereof, and a 3-(dialkylphosphono) dimethylsuccinate having not more than 3 carbon atoms in the alkyl group thereof.

5. An intumescent fire-resistant coating as claimed in claim 1, wherein said synthetic resin is selected from condensation resins, polyaddition resins, and polymerization resins.

6. An intumescent fire-resistant coating as claimed in claim 1, wherein said synthetic resin is selected from a melamine resin, a urea resin, a melamine-urea co-condensation resin, and methylolated and/or methoxymethylated isocyanuric acid, said phosphorus compound is ammonium polyphosphate and/or ammonium polyphosphate powder encapsulated with synthetic resin, and said coating further contains (D) pentaerythritol and/or a derivative thereof and (E) water and/or an organic solvent.

7. An intumescent fire-resistant coating as claimed in claim 1, wherein said synthetic resin and said phosphorus and/or sulfur compound capable of forming a Lewis acid on heating is an acid colloid obtained by reacting a melamine resin with at least one of phosphoric acid, polyphosphoric acid, sulfuric acid, sulfamic acid, and p-toluenesulfonic acid.

8. An intumescent fire-resistant coating as claimed in claim 1, which essentially contains polyurethane and/or polyureid-containing elastomer, an ammonium polyphosphate powder encapsulated with a synthetic resin, melamine, urea or isocyanuric acid, or a condensate thereof and/or a methylol compound etherified with an alcohol having not more than 6 carbon atoms.

9. An intumescent fire-resistant coating as claimed in claim 1, wherein the raw materials of all the components are fine powders having not more than 50 μm.

10. A fire-resistant material comprising a substrate having coated thereon at least one layer of a fire-resistant coating essentially comprising (A) at least one inorganic compound selected from the group consisting of a carbide, boride, nitride, carbonitride, or carboboride of titanium, zirconium, vanadium, niobium, tantalum, molybdenum, tungsten, or chromium and a carbide, nitride or carbonitride of boron, (B) a synthetic resin, and (C) at least one phosphorus and/or sulfur compound capable of forming a Lewis acid on heating.

11. A fire-resistant material comprising a substrate having coated thereon a layer of a fire-resistant coating essentially comprising (A) at least one inorganic compound selected from the group consisting of a carbide, boride, nitride, carbonitride, or carboboride of titanium, zirconium, vanadium, niobium, tantalum, molybdenum, tungsten, or chromium and a carbide, nitride or carbonitride of boron, (B) a synthetic resin, and (C) at least one phosphorus and/or sulfur compound capable of forming a Lewis acid on heating, said layer of a fire-resistant coating having incorporated therein, laminated thereon, or scattered thereon a woven material, a paper-like material, a knitted material, a board, a film, a powder or a granule.

12. A fire-resistant material comprising a substrate having laminated thereon a combination of a fire-resistant coating essentially comprising (A) at least one inorganic compound selected from the group consisting of a carbide, boride, nitride, carbonitride, or carboboride of titanium, zirconium, vanadium, niobium, tantalum, molybdenum, tungsten, or chromium and a carbide, nitride or carbonitride of boron, (B) a synthetic resin, and (C) at least one phosphorus and/or sulfur compound capable of forming a Lewis acid on heating and chopped strands.

13. A fire-resistant material comprising a substrate having laminated thereon a combination of a fire-resistant coating essentially comprising (E) at least one inorganic compound selected from the group consisting of carbide, nitride, boride, carbonitride, and carboboride of silicon, (B) a synthetic resin, and (C) at least one phosphorus and/or sulfur compound capable of forming a Lewis acid on heating and chopped strands.

14. A fire-resistant material as claimed in claim 12, wherein said chopped strands are glass fiber chopped strands.

15. A fire-resistant material as claimed in claim 13, wherein said chopped strands are glass fiber chopped strands.

16. A fire-resistant material as claimed in claim 12, wherein said chopped strands have a cut length of from 3 to 100 mm.

17. A fire-resistant material as claimed in claim 13, wherein said chopped strands have a cut length of from 3 to 100 mm.

18. A fire-resistant material as claimed in claim 12, wherein said substrate is an inorganic salt molded article and/or paper having been previously coated with polyvinyl alcohol and/or hydroxyethyl cellulose.

19. A fire-resistant material as claimed in claim 13, wherein said substrate is an inorganic salt molded article and/or paper having been previously coated with polyvinyl alcohol and/or hydroxyethyl cellulose.

20. A fire-resistant material as claimed in claim 12, wherein said substrate is a wood-based material having been previously coated with a coating composition essentially comprising a compound capable of forming a Lewis acid on heating, a melamine resin, and a phenolic resin.

21. A fire-resistant material as claimed in claim 13, wherein said substrate is a wood-based material having been previously coated with a coating composition essentially comprising a compound capable of forming a Lewis acid on heating, a melamine resin, and a phenolic resin.

22. A fire-resistant material as claimed in claim 12, wherein the chopped strands is laminated on the substrate using, as an adhesive, a composition essentially comprising a compound capable of forming a Lewis acid on heating, a melamine resin, and a phenolic resin.

23. A fire-resistant material as claimed in claim 13, wherein the chopped strands is laminated on the substrate using, as an adhesive, a composition essentially comprising a compound capable of forming a Lewis acid on heating, a melamine resin, and a phenolic resin.

24. A fire-resistant material as claimed in claim 12, wherein the chopped strands is a chopped strand mat treated with a fire-resistant coating.

25. A fire-resistant material as claimed in claim 13, wherein the chopped strands is a chopped strand mat treated with a fire-resistant coating.

26. A fire-resistant material as claimed in claim 12, wherein said substrate is a metallic material having been previously coated with a composition essentially comprising a compound capable of forming a Lewis acid on heating and an epoxy resin.

27. A fire-resistant material as claimed in claim 13, wherein said substrate is a metallic material having been previously coated with a composition essentially comprising a compound capable of forming a Lewis acid on heating and an epoxy resin.

28. A fire-resistant material as claimed in claim 12, wherein chopped strands are laminated on the substrate using, as an adhesive, a composition essentially comprising a compound capable of forming a Lewis acid on heating and an epoxy resin.

29. A fire-resistant material as claimed in claim 13, wherein chopped strands are laminated on the substrate using, as an adhesive, a composition essentially comprising a compound capable of forming a Lewis acid on heating and an epoxy resin.

30. A fire-resistant material as claimed in claim 12, wherein said material further has laminated thereon a decorative layer.

31. A fire-resistant material as claimed in claim 13, wherein said material further has laminated thereon a decorative layer.

32. A fire-resistant material comprising a substrate having laminated thereon a laminate of a chopped strand mat and inorganic fiber woven fabric, said laminate having previously been impregnated with a fire-resistant coating essentially comprising (A) at least one inorganic compound selected from the group consisting of a carbide, boride, nitride, carbonitride, or carboboride of titanium, zirconium, vanadium, niobium, tantalum, molybdenum, tungsten, or chromium and a carbide, nitride or carbonitride of boron, (B) a synthetic resin, and (C) at least one phosphorus and/or sulfur compound capable of forming a Lewis acid on heating and having been laminated on the substrate with said fire-resistant coating before or after drying.

33. A fire-resistant material comprising a substrate having laminated thereon a laminate of a chopped strand mat and inorganic fiber woven fabric, said laminate having previously been impregnated with a fire-resistant coating essentially comprising (E) at least one inorganic compound selected from the group consisting of carbide, nitride, boride, carbonitride, and carboboride of silicon, (B) a synthetic resin, and (C) at least one phosphorus and/or sulfur compound capable of forming a Lewis acid on heating and having been laminated on the base with said fire-resistant coating before or after drying.

34. A fire-resistant material as claimed in claim 12, wherein said chopped strands are laminated using, as an adhesive, a composition essentially comprising a condensation resin and a phosphorus and/or sulfur compound capable of forming a Lewis acid on heating.

35. A fire-resistant material as claimed in claim 13, wherein said chopped strands are laminated using, as an adhesive, a composition essentially comprising a condensation resin and a phosphorus and/or sulfur compound capable of forming a Lewis acid on heating.

36. A process for producing a fire-resistant material comprising laminating on a substrate a mixture of chopped strands and a fire-resistant coating essentially comprising (A) at least one inorganic compound selected from the group consisting of a carbide, boride, nitride, carbonitride, or carboboride of titanium, zirconium, vanadium, niobium, tantalum, molybdenum, tungsten, or chromium and a carbide, nitride or carbonitride of boron, (B) a synthetic resin, and (C) at least one phosphorus and/or sulfur compound capable of forming a Lewis acid on heating.

37. A process for producing a fire-resistant material comprising laminating on a substrate a mixture of chopped strands and a fire-resistant coating essentially comprising (E) at least one inorganic compound selected from the group consisting of carbide, nitride, boride, carbonitride, and carboboride of silicon, (B) a synthetic resin, and (C) at least one phosphorus and/or sulfur compound capable of forming a Lewis acid on heating.

38. A process for producing a fire-resistant material comprising laminating on a substrate a mixture of chopped strands and a fire-resistant coating essentially comprising (A) at least one inorganic compound selected from the group consisting of a carbide, boride, nitride, carbonitride, or carboboride of titanium, zirconium, vanadium, niobium, tantalum, molybdenum, tungsten, or chromium and a carbide, nitride or carbonitride of boron, (B) a synthetic resin, and (C) at least one phosphorus and/or sulfur compound capable of forming a Lewis acid on heating and further laminating thereon inorganic fiber woven fabric.

39. A process for producing a fire-resistant material comprising laminating on a substrate a mixture of chopped strands and a fire-resistant coating essentially comprising (E) at least one inorganic compound selected from the group consisting of carbide, nitride, boride, carbonitride, and carboboride of silicon, (B) a synthetic resin, and (C) at least one phosphorus and/or sulfur compound capable of forming a Lewis acid on heating and further laminating thereon inorganic fiber woven fabric.

40. A process for producing a fire-resistant material comprising scattering chopped strands on a substrate, coating thereon an adhesive and then a fire-resistant coating essentially comprising (A) at least one inorganic compound selected from the group consisting of a carbide, boride, nitride, carbonitride, or carboboride of titanium, zirconium, vanadium, niobium, tantalum, molybdenum, tungsten, or chromium and a carbide, nitride or carbonitride of boron, (B) a synthetic resin, and (C) at least one phosphorus and/or sulfur compound capable of forming a Lewis acid on heating, drying the coated layer to obtain a sheet, and laminating the sheet on a substrate using an adhesive.

41. A process for producing a fire-resistant material comprising scattering chopped strands on a substrate, coating thereon an adhesive and then a fire-resistant coating essentially comprising (E) at least one inorganic compound selected from the group consisting of carbide, nitride, boride, carbonitride, and carboboride of silicon, (B) a synthetic resin, and (C) at least one phosphorus and/or sulfur compound capable of forming a Lewis acid on heating, drying the coated layer to obtain a sheet, and laminating the sheet on a substrate using an adhesive.

42. A process for producing a fire-resistant material comprising applying an adhesive to a substrate, scattering chopped strands thereon or laminating a chopped strand mat thereon, coating a fire-resistant coating essentially comprising (A) at least one inorganic compound selected from the group consisting of a carbide, boride, nitride, carbonitride, or carboboride of titanium, zirconium, vanadium, niobium, tantalum, molybdenum, tungsten, or chromium and a carbide, nitride or carbonitride of boron, (B) a synthetic resin, and (C) at least one phosphorus and/or sulfur compound capable of forming a Lewis acid on heating, and drying the coated layer.

43. A process for producing a fire-resistant material comprising applying an adhesive to a substrate, scattering chopped strands thereon or laminating a chopped strand mat thereon, coating a fire-resistant coating essentially comprising (E) at least one inorganic compound selected from the group consisting of carbide, nitride, boride, carbonitride, and carboboride of silicon, (B) a synthetic resin, and (C) at least one phosphorus and/or sulfur compound capable of forming a Lewis acid on heating, and drying the coated layer.

44. A fire-resistant sheet obtained by treating chopped strands or a chopped strand mat with a fire-resistant coating essentially comprising (A) at least one inorganic compound selected from the group consisting of a carbide, boride, nitride, carbonitride, or carboboride of titanium, zirconium, vanadium, niobium, tantalum, molybdenum, tungsten, or chromium and a carbide, nitride or carbonitride of boron, (B) a synthetic resin, and (C) at least one phosphorus and/or sulfur compound capable of forming a Lewis acid on heating.

45. A fire-resistant sheet obtained by treating chopped strands or a chopped strand mat with a fire-resistant coating essentially comprising (E) at least one inorganic compound selected from the group consisting of carbide, nitride, boride, carbonitride, and carboboride of silicon, (B) a synthetic resin, and (C) at least one phosphorus and/or sulfur compound capable of forming a Lewis acid on heating.

46. A fire-resistant paste comprising chopped strands and a fire-resistant coating essentially comprising (A) at least one inorganic compound selected from the group consisting of a carbide, boride, nitride, carbonitride, or carboboride of titanium, zirconium, vanadium, niobium, tantalum, molybdenum, tungsten, or chromium and a carbide, nitride or carbonitride of boron, (B) a synthetic resin, and (C) at least one phosphorus and/or sulfur compound capable of forming a Lewis acid on heating.

47. A fire-resistant paste comprising chopped strands and a fire-resistant coating essentially comprising (E) at least one inorganic compound selected from the group consisting of carbide, nitride, boride, carbonitride, and carboboride of silicon, (B) a synthetic resin, and (C) at least one phosphorus and/or sulfur compound capable of forming a Lewis acid on heating.

48. An intumescent fire-resistant coating as claimed in claim 1, wherein said synthetic resin is a nitrogen-containing synthetic resin.

49. A fire-resistant material as claimed in claim 10, wherein said synthetic resin is a nitrogen-containing synthetic resin.

50. A fire-resistant material as claimed in claim 12, wherein said synthetic resin is a nitrogen-containing synthetic resin.

51. A fire-resistant material as claimed in claim 13, wherein said synthetic resin is a nitrogen-containing synthetic resin.

52. A fire-resistant material as claimed in claim 32, wherein said synthetic resin is a nitrogen-containing synthetic resin.

53. A fire-resistant material as claimed in claim 33, wherein said synthetic resin is a nitrogen-containing synthetic resin.

* * * * *